United States Patent

Cucheran et al.

[11] Patent Number: 6,112,964
[45] Date of Patent: Sep. 5, 2000

[54] VEHICLE ARTICLE CARRIER HAVING SINGLE SIDE RELEASABLE LOCKING MECHANISM

[75] Inventors: John S. Cucheran, Lake Orion; Jeffrey M. Aftanas, Sterling Heights, both of Mich.

[73] Assignee: JAC Products, Inc., Ann Arbor, Mich.

[21] Appl. No.: 09/320,036

[22] Filed: May 26, 1999

Related U.S. Application Data

[63] Continuation-in-part of application No. 09/024,096, Feb. 17, 1998, abandoned.

[51] Int. Cl.[7] ............................. B60R 9/00; B60R 9/045
[52] U.S. Cl. .......................................... 224/321; 224/309
[58] Field of Search ................................. 224/309, 310, 224/321, 322, 329, 331, 325, 326

[56] References Cited

U.S. PATENT DOCUMENTS

| | | |
|---|---|---|
| 2,888,178 | 5/1959 | Olson . |
| 4,294,388 | 10/1981 | Wiinstel . |
| 4,448,337 | 5/1984 | Cronce . |
| 4,500,020 | 2/1985 | Rasor . |
| 4,635,992 | 1/1987 | Hamilton et al. ................... 224/404 X |
| 4,705,198 | 11/1987 | Kamaya ................................. 224/329 |
| 4,722,646 | 2/1988 | McIntyre . |
| 4,757,929 | 7/1988 | Nelson ................................... 224/329 |
| 4,768,691 | 9/1988 | Stapleton . |
| 5,190,198 | 3/1993 | Cucheran . |
| 5,226,570 | 7/1993 | Pedrini . |
| 5,423,465 | 6/1995 | Kauka et al. . |
| 5,456,512 | 10/1995 | Gibbs et al. ........................ 224/321 X |
| 5,472,256 | 12/1995 | Tucker . |
| 5,588,572 | 12/1996 | Cronce et al. . |
| 5,715,980 | 2/1998 | Blankenburg et al. . |
| 5,924,614 | 7/1999 | Kuntze et al. . |
| 6,015,075 | 1/2000 | Stapleton ................................ 224/321 |
| 6,050,467 | 4/2000 | Drouillard et al. ..................... 224/321 |

FOREIGN PATENT DOCUMENTS

| | | |
|---|---|---|
| WO 90/02668 | 3/1990 | WIPO . |
| WO 97/19832 | 6/1997 | WIPO . |

*Primary Examiner*—Gregory M. Vidovich
*Attorney, Agent, or Firm*—Harness, Dickey & Pierce, PLC

[57] ABSTRACT

A vehicle article carrier having a pair of bracket members at the outer ends of a cross bar, where both bracket members can be unlocked from a pair of slats simultaneously through a single actuating member associated with one of the bracket members. In one embodiment an elongated cable extends through the cross bar and couples an actuating member associated with a bracket member at a first end of the cross bar with a locking member associated with a second bracket member at the opposite end of the cross bar. The locking member is biased into a locked position via an independent biasing member which serves to lock both bracket members to their associated slats. Moving the actuating member into an unlocked position allows both bracket members to be placed in unlocked positions simultaneously. Releasing the actuating member allows the biasing member to return both bracket members into locking engagement with their respective slats.

12 Claims, 15 Drawing Sheets

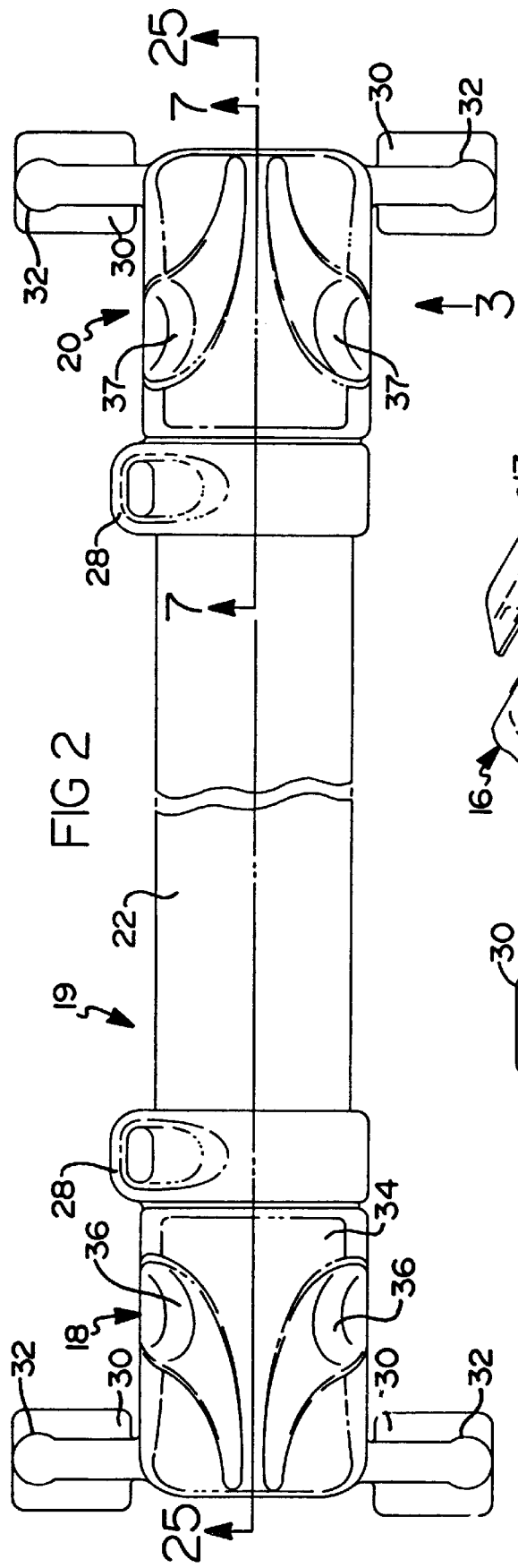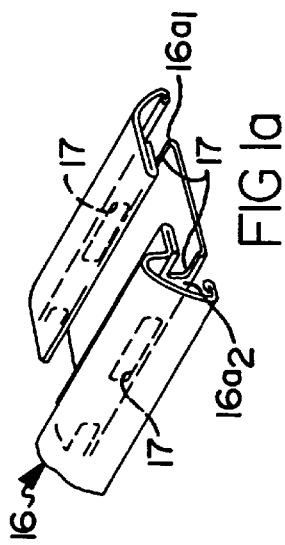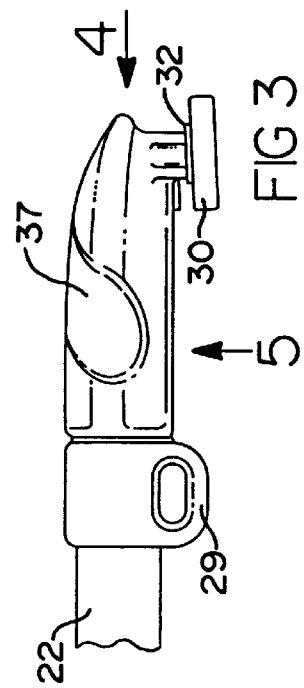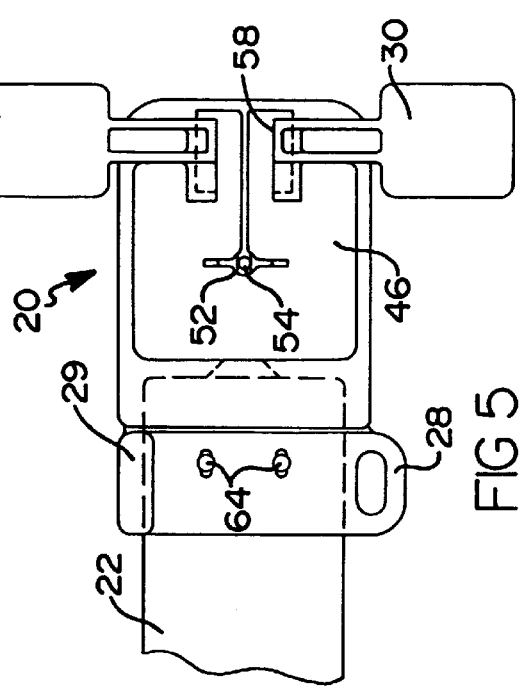

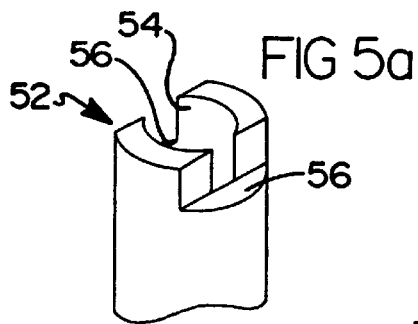
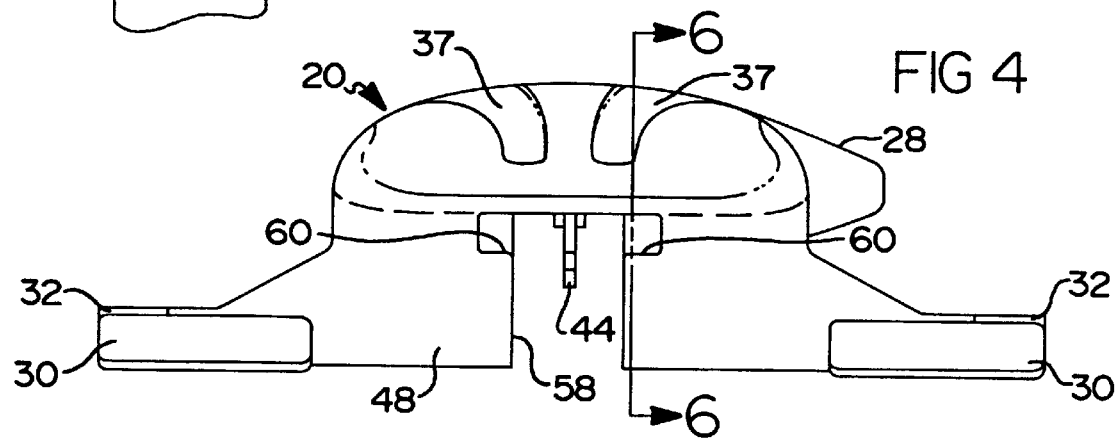
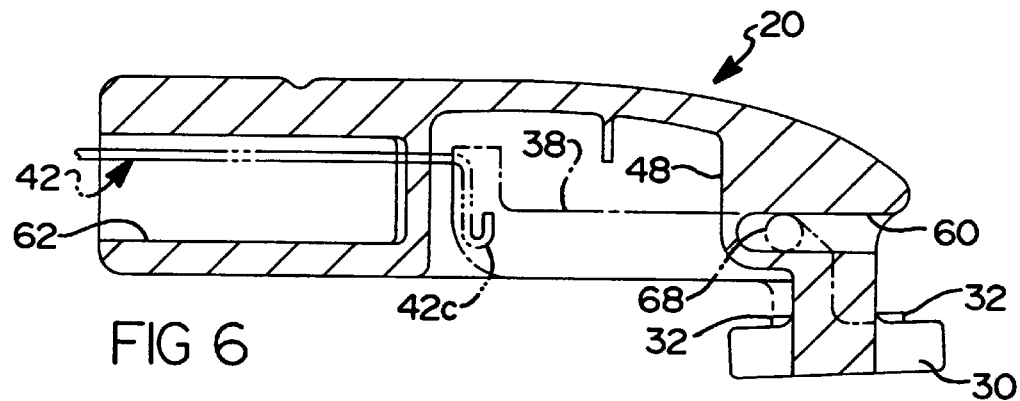
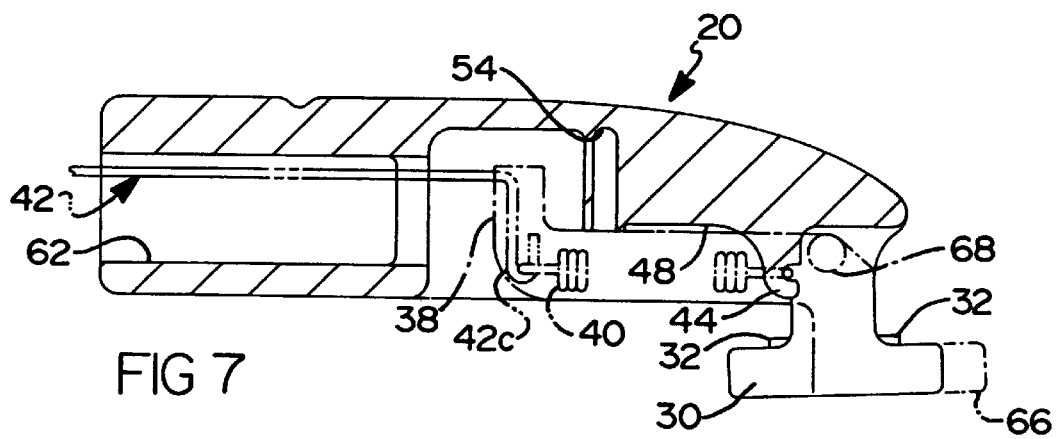

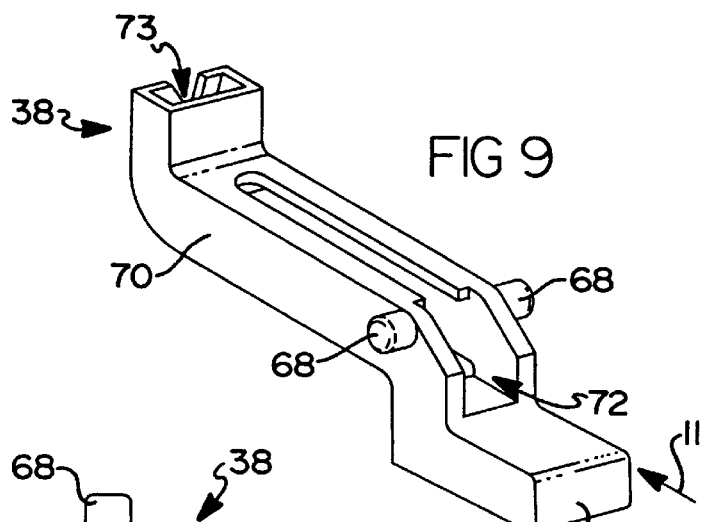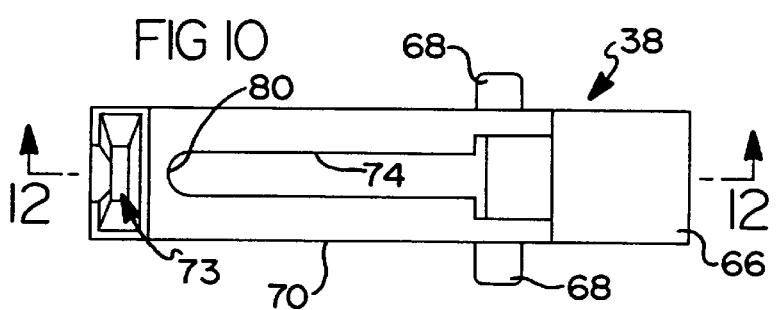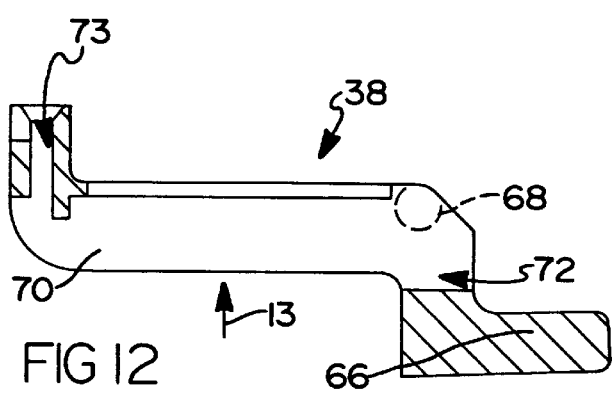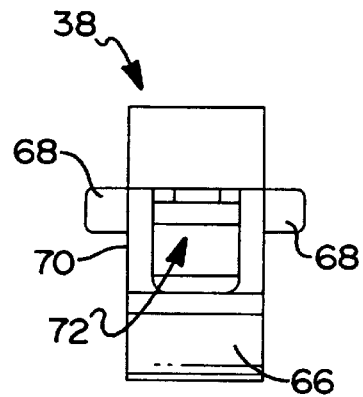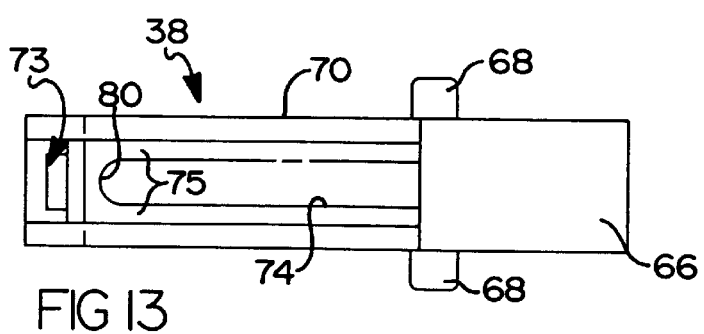

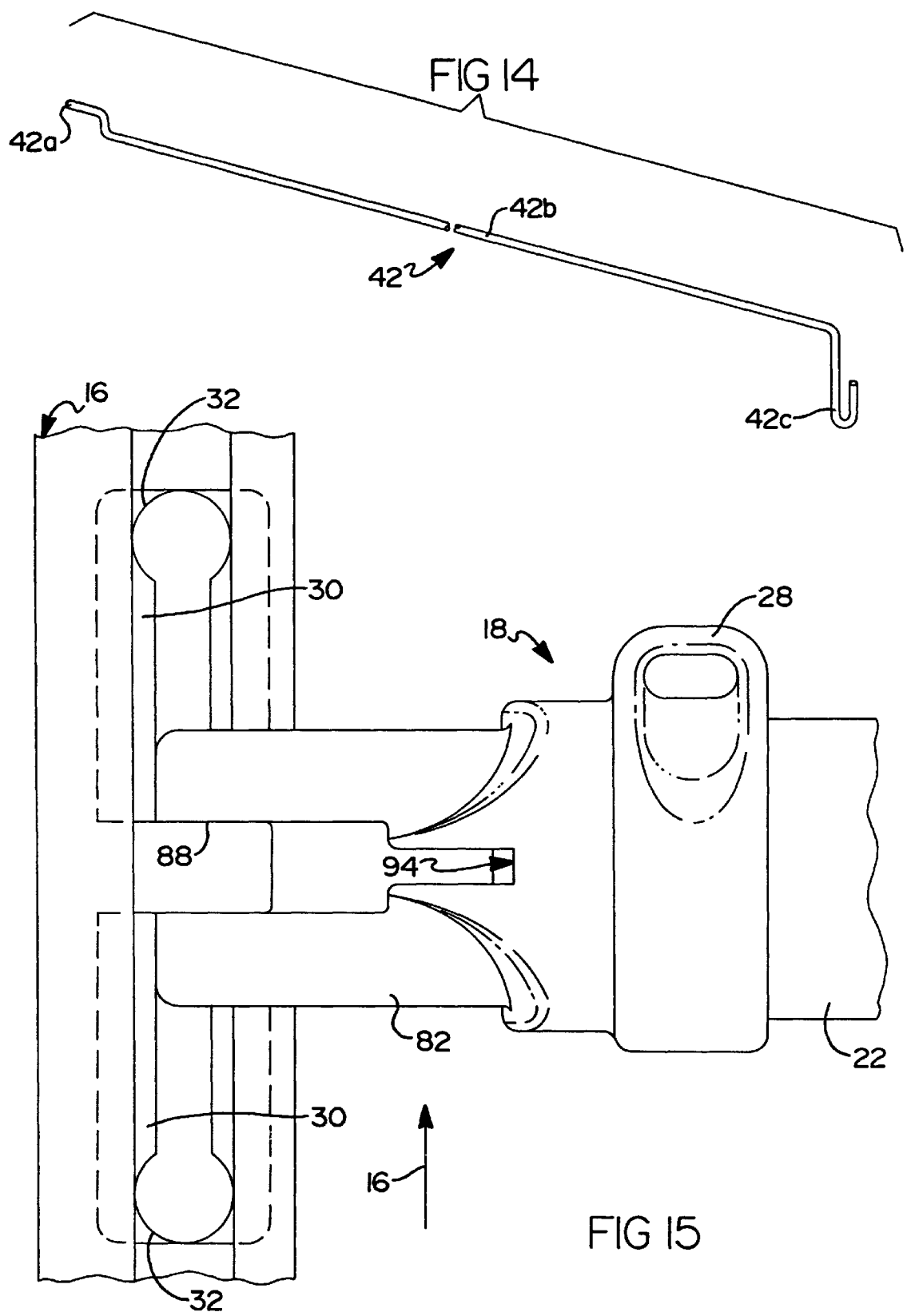

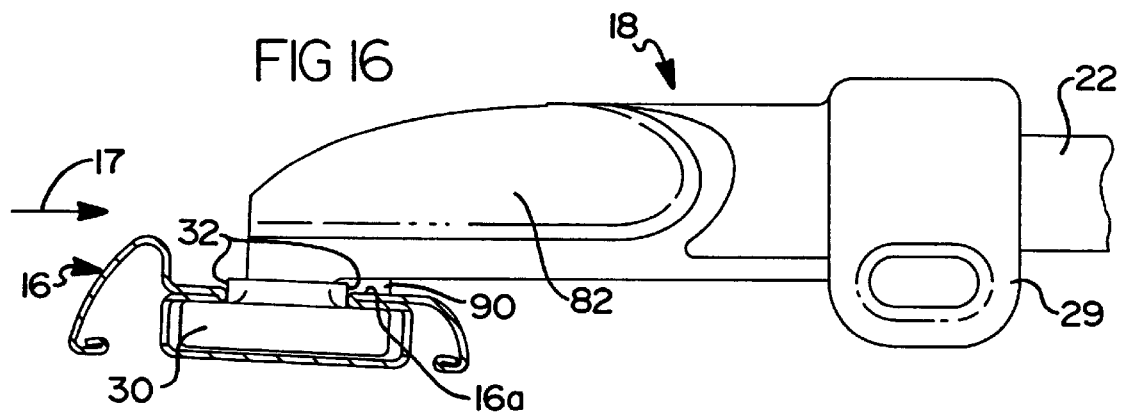
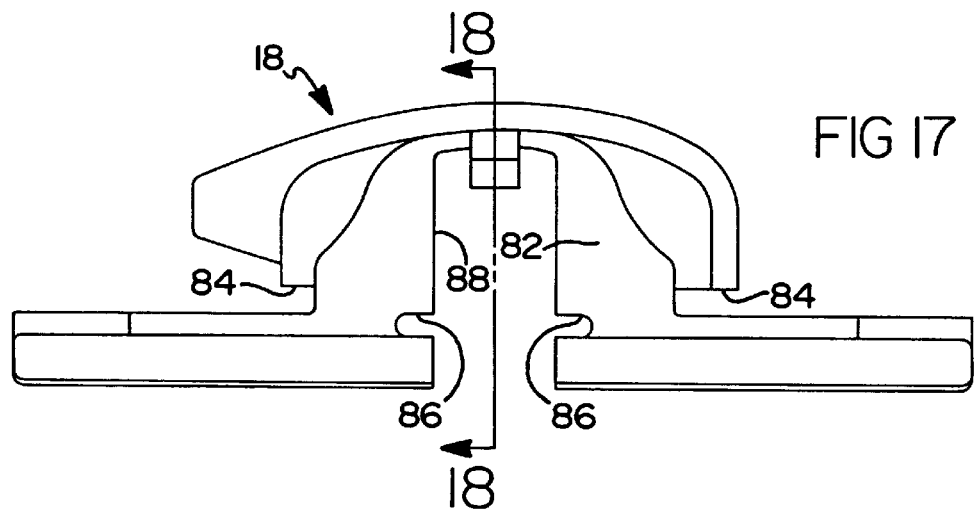
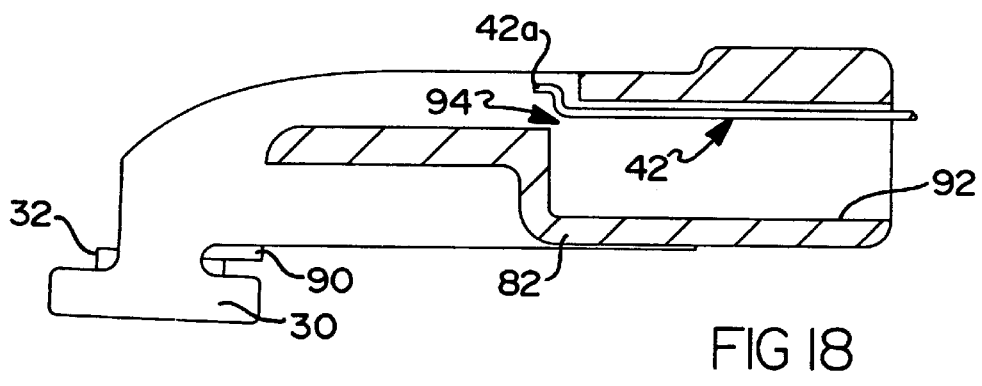

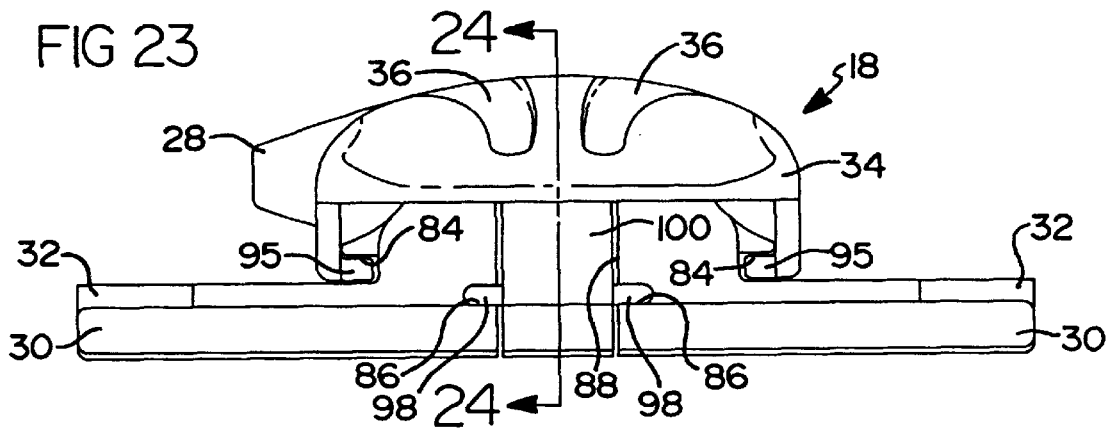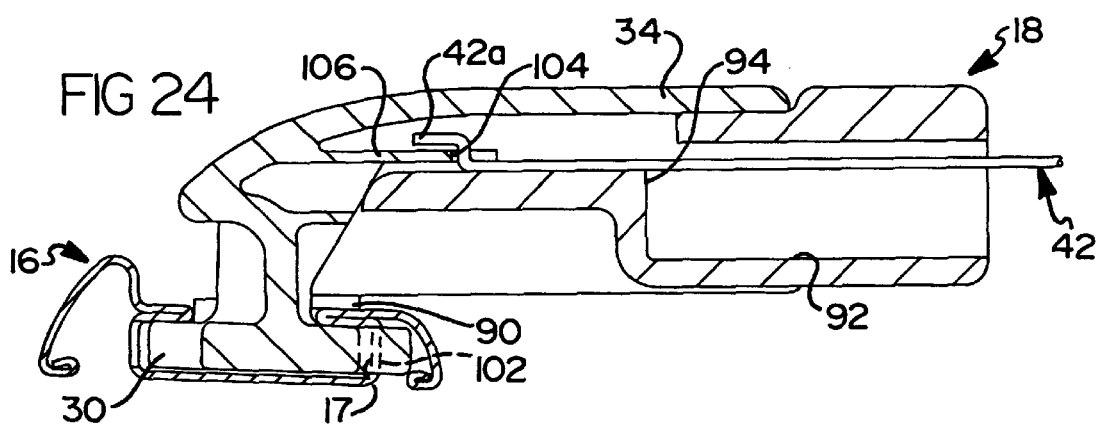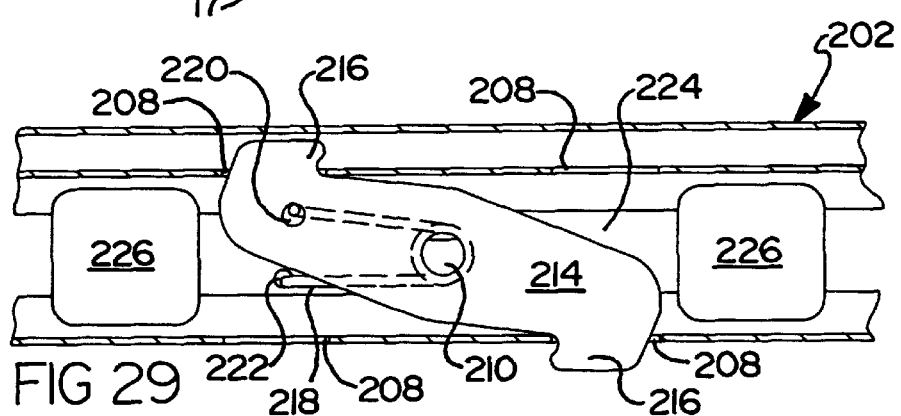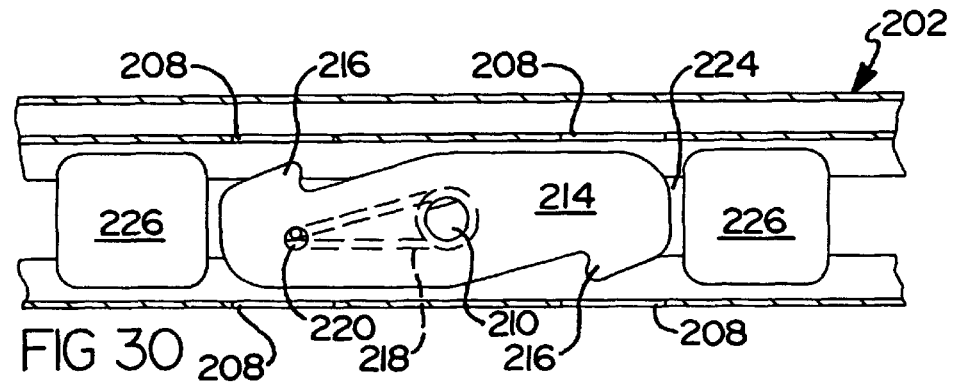

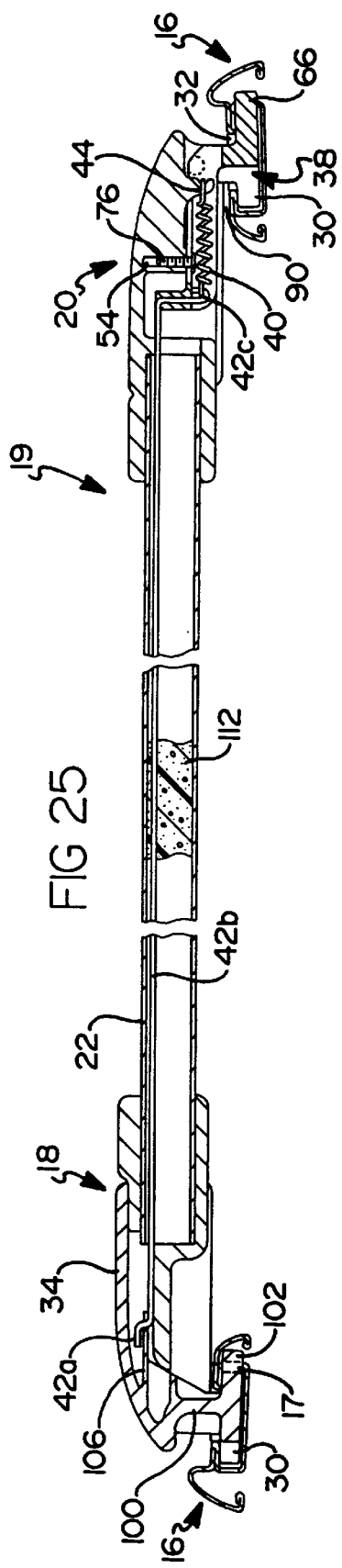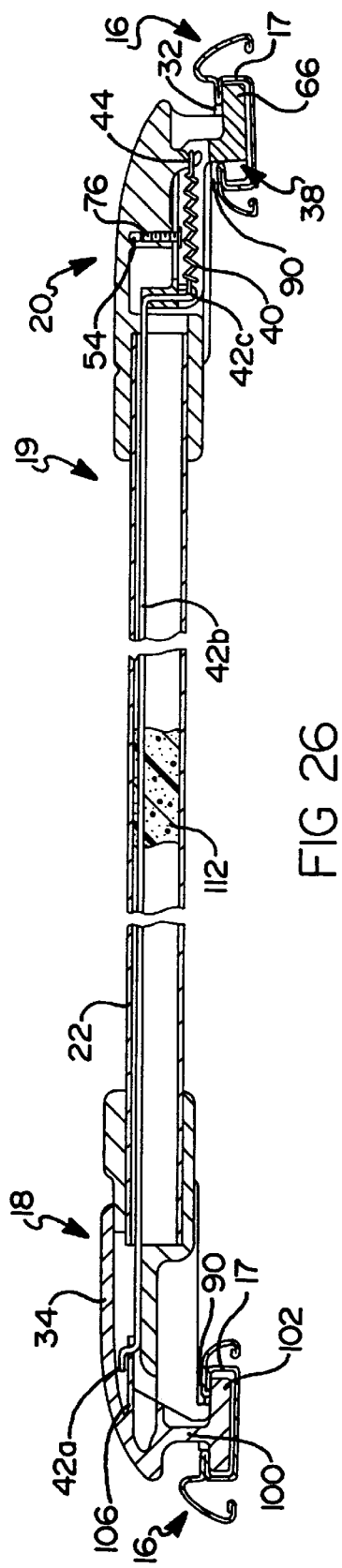

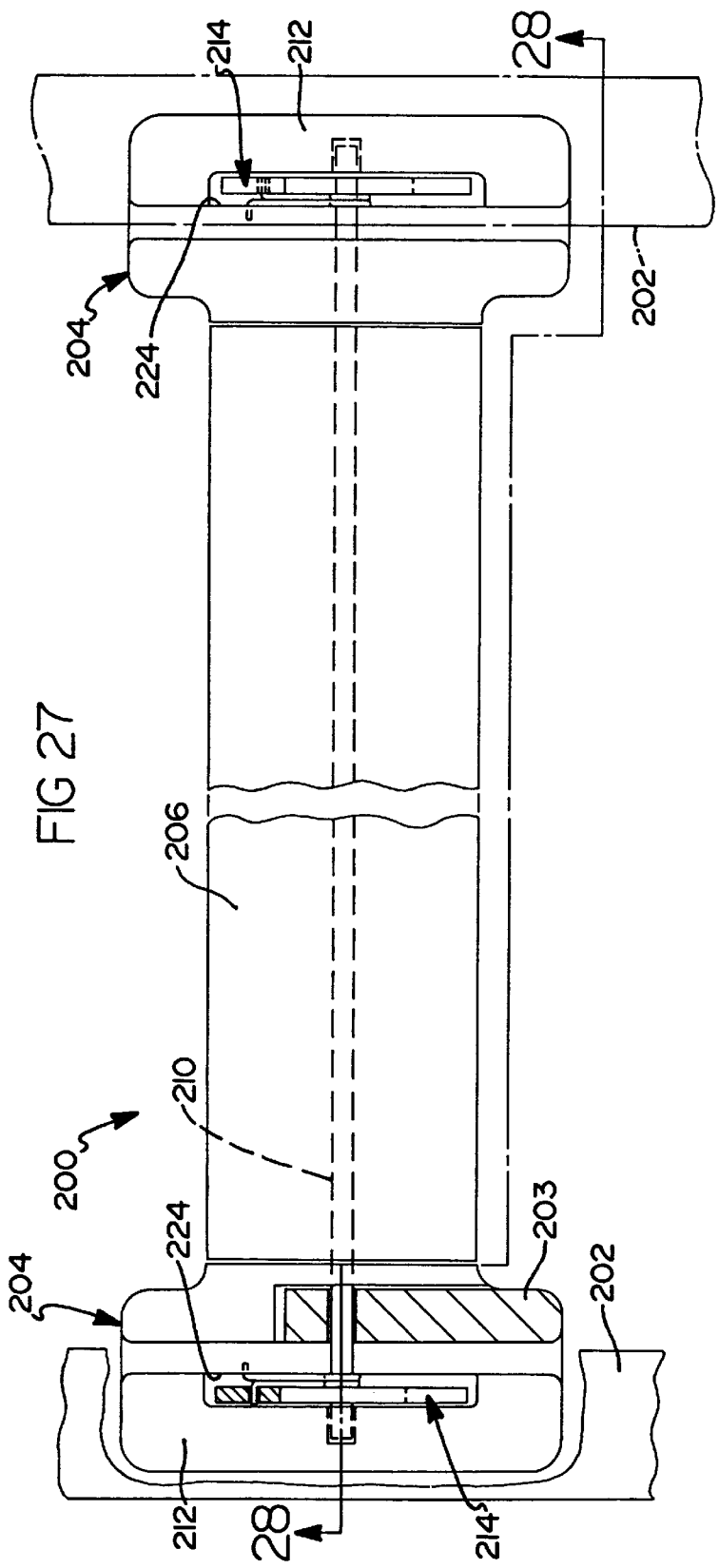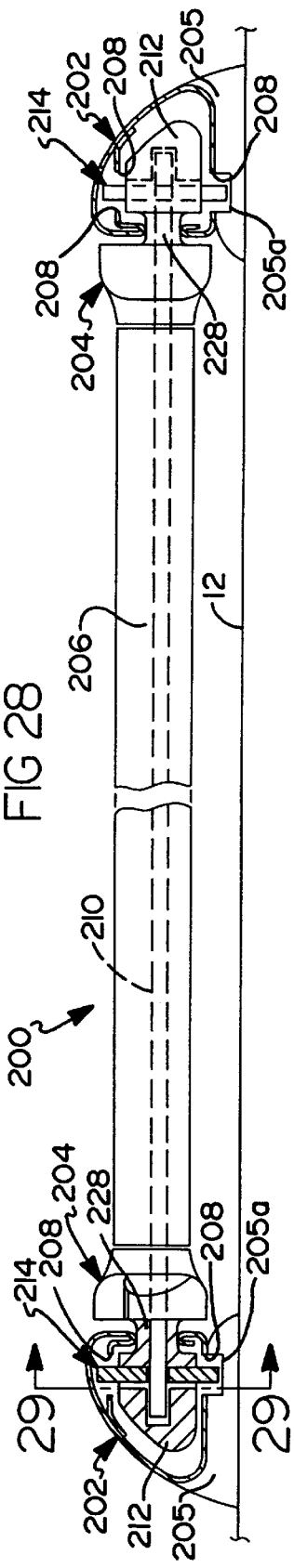

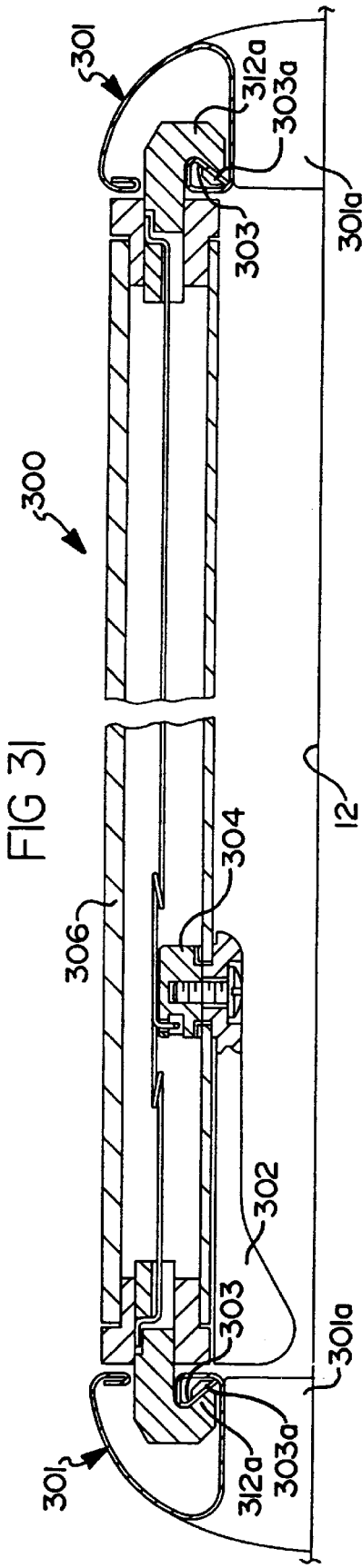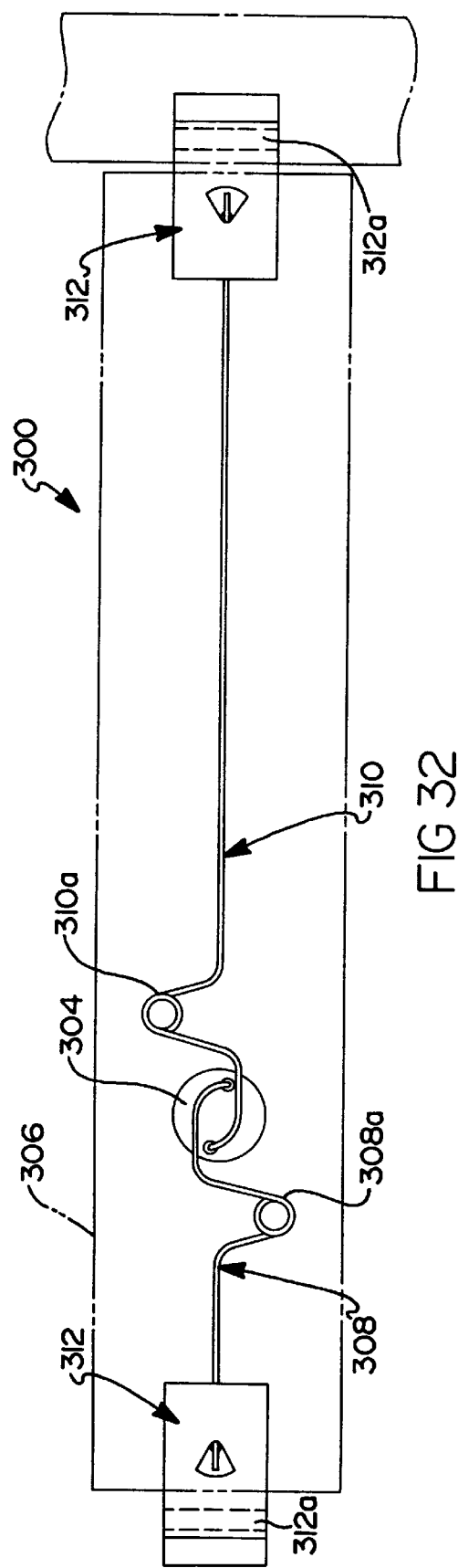
FIG 31
FIG 32

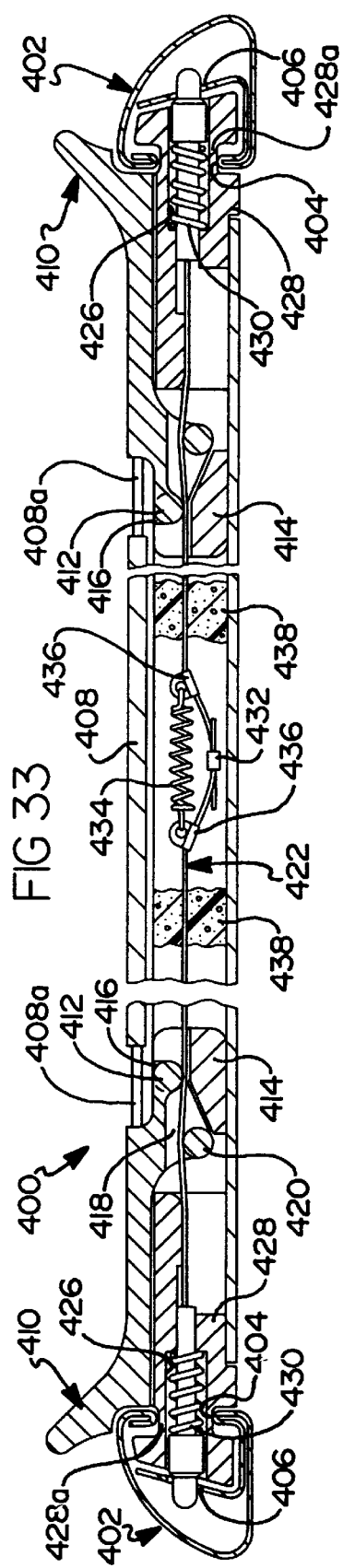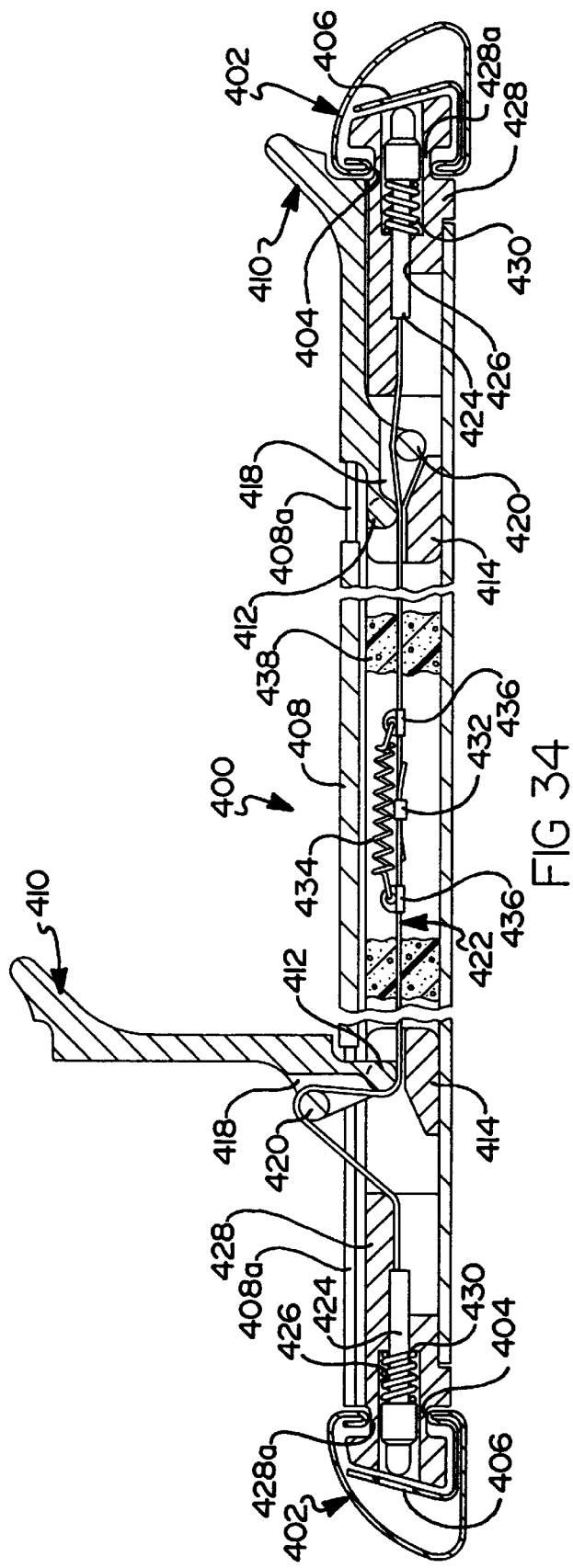

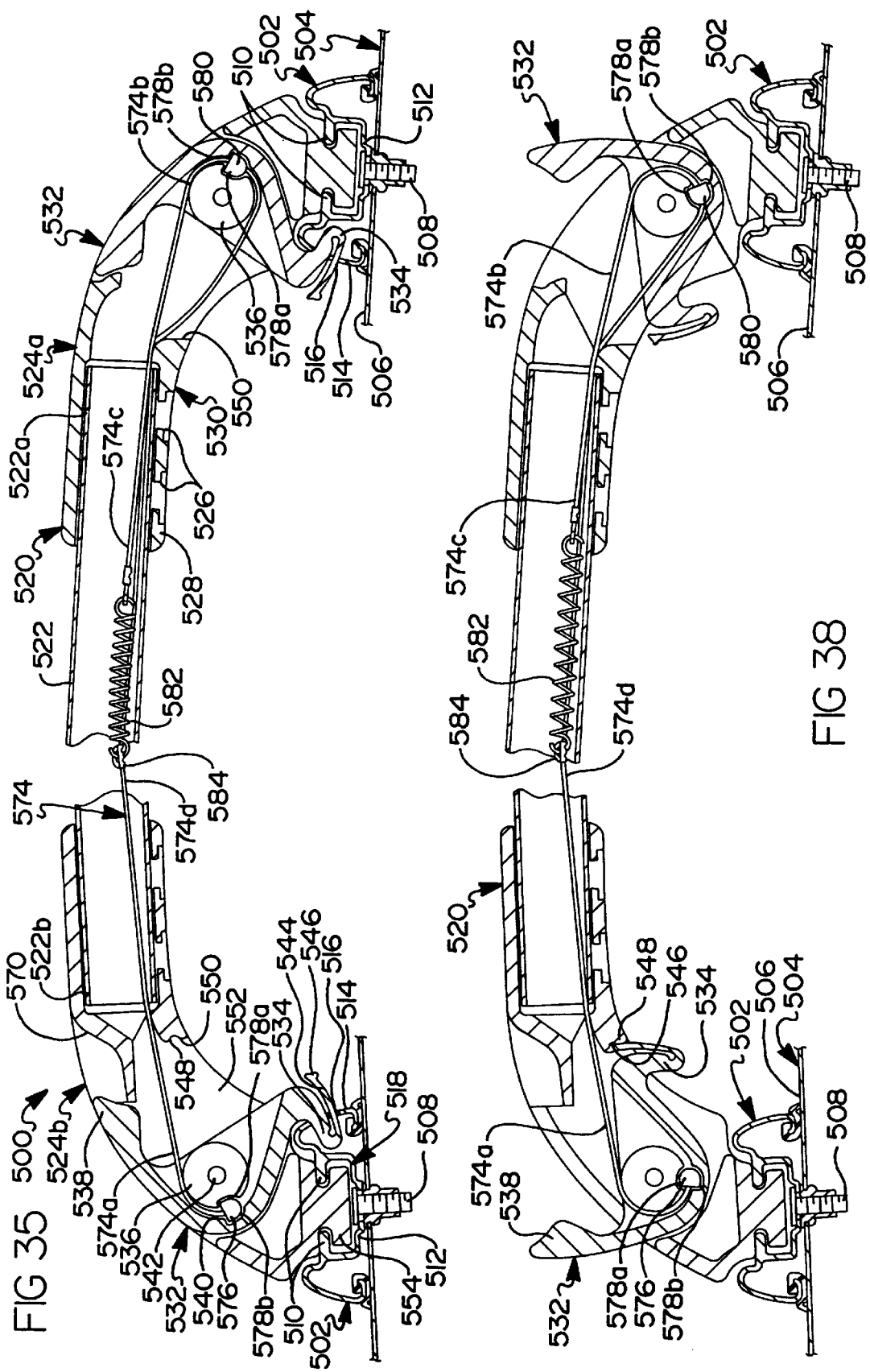

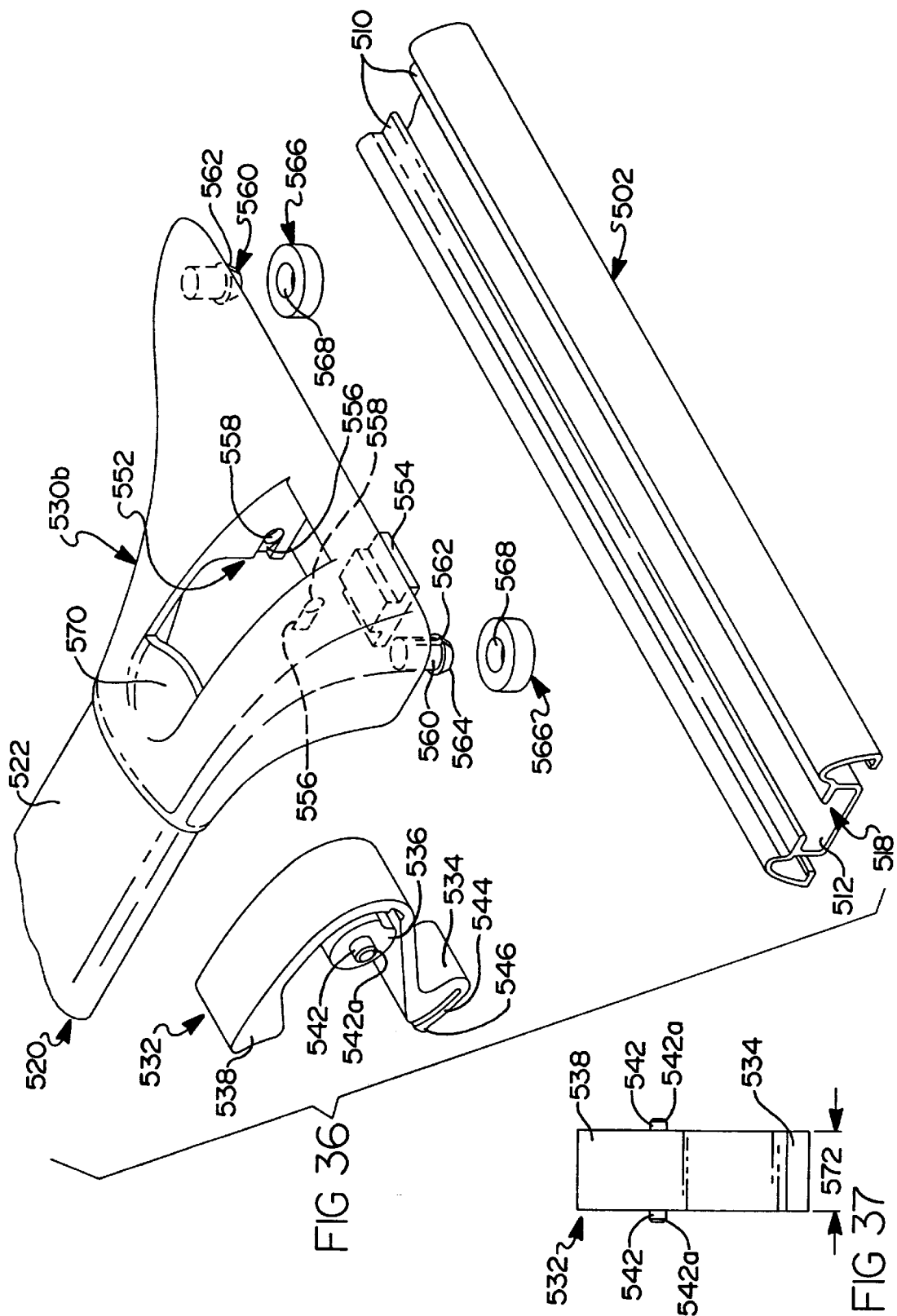

VEHICLE ARTICLE CARRIER HAVING SINGLE SIDE RELEASABLE LOCKING MECHANISM

CROSS-REFERENCE TO RELATED APPLICATION

This application is a continuation-in-part of U.S. application Ser. No. 09/024,096, filed Feb. 17, 1998, now abandoned.

BACKGROUND OF THE INVENTION

1. Technical Field

This invention relates to vehicle article carriers, and more particularly to a vehicle article carrier incorporating a locking mechanism which allows a user to simultaneously place both bracket members of the article carrier in locked and unlocked positions by manually engaging a single actuating member at one side of the vehicle article carrier.

2. Discussion

Vehicle article carriers are used in a wide variety of applications to transport a variety of articles above an outer body surface of the vehicle. Such vehicle article carriers typically include a pair of slats which are fixedly mounted to the outer body surface of the vehicle, a pair of bracket members slidably disposed on the slats and a cross bar disposed between the bracket members so as to be supported above the outer body surface by the bracket members. In some applications two cross bars are employed, with the second cross bar being secured either fixedly to the slats or being adjustably secured via its own pair of bracket members disposed slidably upon the slats.

Each bracket member used in most vehicle article carrier systems typically includes some form of locking mechanism with an actuating member for placing the locking mechanism in a locked or unlocked position. When the locking mechanism of each bracket member is in its unlocked position, both bracket members may be moved slidably along the slats to allow the cross bar therebetween to be repositioned as desired along the slats. The obvious drawback to this arrangement is that when the user desires to reposition the cross bar, first one of the bracket members must be unlocked and then the user must walk around to the opposite side of the vehicle to unlock the other bracket member. Once the cross bar has been moved to its desired position by the user, the user must manually place both of the bracket members in their locked positions. Thus, the user is presented with the inconvenience of separately locking and unlocking two bracket members whenever the cross bar is to be repositioned.

Some manufacturers of vehicle article carriers have attempted to address this problem by providing means for simultaneously locking and unlocking each bracket member via a single actuating mechanism. One such article carrier is disclosed in U.S. Pat. No. 5,190,198 to Cucheran, assigned to the assignee of the present application. While this device has proven to be successful and satisfactory for its intended purpose, the number of independent component parts associated with the apparatus disclosed in this patent make the apparatus somewhat complicated and costly to manufacture and assemble. Other forms of vehicle article carriers which have attempted to incorporate some form of "single-sided" release mechanism for simultaneously locking and unlocking a pair of bracket members to their respective slats have also proven to be complicated and costly to construct.

Accordingly, it would be highly desirable to provide a vehicle article carrier which incorporates a means for simultaneously locking and unlocking both bracket members from their respective slats, as well as a means for holding both bracket members in their unlocked positions once one of the bracket members is urged into an unlocked orientation. In this manner, a user would be able to lock and unlock both bracket members from one side of the vehicle and adjust both ends of the cross bar to a new position on the slats without having to hold one of the bracket members in its unlocked orientation. This would add significant convenience to the procedure of repositioning the cross bar.

It would also be highly desirable to provide a vehicle article carrier having a mechanism which enables both bracket members to be simultaneously locked and unlocked, wherein the mechanism has a minimum number of moving parts, and incorporates a design which is relatively simple and cost effective to manufacture and assemble.

SUMMARY OF THE INVENTION

The above and other objects are provided by a vehicle article carrier apparatus having a single-sided release mechanism in accordance with preferred embodiments of the present invention. The apparatus generally includes a pair of slats which are adapted to be fixedly secured to an outer body surface of a vehicle, a cross bar, and a pair of bracket members disposed at opposite outer ends of the cross bar. Each of the bracket members is adapted to move slidably upon an associated one of the slats to allow the cross bar to be repositioned along the slats as may be needed.

In one preferred embodiment each bracket member further includes a slidably disposed locking finger member. One of the locking finger members is operably associated with a biasing member, and both locking finger members are operably coupled together via an elongated member which extends through the cross bar. The biasing member thus continuously biases both of the locking finger members into locked positions relative their associated slats.

In the preferred embodiment described above, one of the bracket members further includes an actuating member operably associated with at least one of the locking finger members. The actuating member is disposed slidably such that movement of the actuating member from a locked to an unlocked position causes each of the locking finger members to be simultaneously urged out of locking engagement with its respective slat. Releasing the actuating member permits the biasing member to return both locking finger members into locking engagement with their respective slats, as well as to return the actuating member to its locked position.

In one preferred embodiment the actuating member and one of the locking finger members are integrally formed as a single component. The elongated member is further comprised of an elongated metal rod which is coupled at its outer ends to both of the locking finger members.

In the preferred embodiment described above, each of the bracket members further include a pair of foot portions which ride within channels formed in the slats. Each of the foot portions further include at least one semi-circular, protruding shoulder portion which helps to prevent binding or jamming of the cross bar as same is repositioned along each of the slats.

Various alternative embodiments of the present invention are also disclosed. In one alternative preferred embodiment the actuating member forms a rotatable actuating lever fixedly secured to a rigid, elongated rod extending through the cross bar into each of the bracket members secured to opposite ends of the cross bar. The elongated rod is fixedly coupled to a latching member extending outwardly of each one of the bracket members into a channel of an associated slat. Each latching member is biased such that it is normally in a locked position engaging at least one of a plurality of openings spaced apart along the channel of its associated slat. Rotatable movement of the actuating lever causes a corresponding movement of the elongated rod, which in turn causes each of the latching members to be urged simultaneously into an unlocked position relative to its associated slat. Releasing the lever allows the biasing members associated with each latching member to rotate the elongated rod, and thus the actuating lever, in the opposite direction such that both latching members are returned to a normally locked position relative to their respective slats.

In another alternative embodiment an actuating lever is disposed intermediate the ends of a cross bar. The actuating lever is secured to a disc-like member disposed within the cross bar such that it rotates the disc-like member when moved between locked and unlocked positions. Also attached to the disc-like member are first and second elongated members. The elongated members are also attached at their outermost ends to locking finger members. Thus, movement of the actuating lever from a locked to an unlocked position causes a corresponding rotation of the disc-like member, which also causes translation of the first and second elongated members away from each other. This urges each of the locking finger members out of locking engagement with openings in each of the slats. Movement of the actuating lever from the unlocked to the locked position causes movement of the first and second elongated members towards each other, thereby retracting both of the locking finger members simultaneously. Thus, the locking finger members can be simultaneously moved into locked and unlocked positions from a single actuating lever disposed near one end of the cross bar.

In yet another alternative preferred embodiment a pivotably disposed actuating lever is associated with the cross bar. An elongated member such as a cable is entrained through a portion of the actuating lever so as to be disposed within the interior of the cross bar when the actuating lever is in a locked position. The outer ends of the elongated cable are coupled to independent locking members disposed in bracket members at the outer ends of the cross bar. Each locking member is biased into locking engagement with an opening in an associated slat. Moving the actuating lever from a locked to an unlocked position causes a portion of the elongated cable to be displaced. This serves to shorten the elongated cable, simultaneously urging both of the locking members out of locking engagement with their respective slats. In this embodiment, a second actuating lever is disposed towards an opposite end of the cross bar such that the locking members can be unlocked and locked from each side of the vehicle.

In still another alternative preferred embodiment, the present invention incorporates a pair of bracket members having locking members which are adapted to be snapped into engagement within recesses formed in openings in their respective bracket members. Thus, no separate pivot pins, axles or like components need be incorporated to permit pivotal movement of each locking member within its bracket member. This embodiment also includes an elongated cable which extends through an interior area of a cross bar to couple each of the locking members together. Movement of one locking member therefore causes both locking members to be urged simultaneously into either locked or unlocked positions.

The just-described preferred embodiment provides a significant improvement in the ease of assembly of a single side release mechanism. Assembly is accomplished simply by threading the one end of the cable through a channel formed in the locking member, snapping the locking member into the opening in its associated bracket member, threading the opposite end of the cable through the interior of the cross bar, hooking the opposite end into a channel formed in the other bracket member, and snapping the other bracket member into the opening in its associated bracket member. No special tools are required for the assembly of the cross bar to its bracket members or the assembly of the cable and the locking members into the bracket members. The entire assembly process can be performed by a single individual in just minutes.

All of the above-described preferred embodiments provide a vehicle article carrier having a cross bar which can be conveniently locked and unlocked from one side of the vehicle. Each of the embodiments are constructed from a relatively few component parts, thereby reducing manufacturing and assembly costs as compared to previously developed single-sided article carrier mechanisms

BRIEF DESCRIPTION OF THE DRAWINGS

The various advantages of the present invention will become apparent to one skilled in the art by reading the following specification and subjoined claims and by referencing the following drawings in which:

FIG. 1a is a perspective view of an end portion of the left or far-most slat in FIG. 1 showing the openings formed in each wall portion thereof;

FIG. 2 is a plan view of one article carrier member of the vehicle article carrier of FIG. 1;

FIG. 3 is a side view of one of the bracket members and a portion of the cross bar shown in FIG. 2 taken in accordance with directional line 3 in FIG. 2;

FIG. 4 is an end view of the bracket member shown in FIG. 3 taken in accordance with directional line 4 in FIG. 3, with the locking finger member omitted;

FIG. 5 is a bottom view of the bracket member of FIG. 3 taken in accordance with directional line 5 in FIG. 3;

FIG. 5a is a perspective view of just the boss portion shown in FIG. 5;

FIG. 6 is a cross sectional side view of the bracket member of FIG. 4 taken in accordance with section line 6—6 in FIG. 4 and also illustrating the locking finger member in phantom in an unlocked or retracted position together with a portion of the elongated rod;

FIG. 7 is a cross sectional side view of the right side bracket member of FIG. 1 taken in accordance with section line 7—7 in FIG. 2, illustrating the locking finger member in phantom in a locked or extended position;

FIG. 9 is a perspective view of the locking finger member used in the bracket member shown in FIGS. 6–8;

FIG. 10 is a plan view of the locking finger member of FIG. 9;

FIG. 11 is a front view of the locking finger member in accordance with directional line 11 in FIG. 9;

FIG. 12 is a cross sectional side view of the locking finger member of FIG. 10 in accordance with section line 12—12 in FIG. 10;

FIG. 13 is a bottom view of the locking finger member in accordance with directional line 13 in FIG. 12;

FIG. 14 is a perspective view of the elongated actuating rod which extends through the cross bar shown in FIG. 2;

FIG. 15 is a plan view of the left hand bracket member of FIG. 2 disposed on its associated slat but with the actuating member omitted;

FIG. 16 is a side view of the left hand bracket member shown in FIG. 15 in accordance with directional line 16 in FIG. 15;

FIG. 17 is an end view of the bracket member of FIG. 16 taken in accordance with directional line 17 in FIG. 16 illustrating the bracket member without the actuating member and without the slat shown in FIG. 16;

FIG. 18 is a cross sectional side view of the bracket member of FIG. 17 in accordance with section line 18—18 in FIG. 17;

FIG. 23 is an end view of the actuating member of FIG. 20 assembled to the bracket member of FIG. 17;

FIG. 24 is a cross sectional side view of the assembled bracket member of FIG. 23 taken in accordance with section line 24—24 in FIG. 23;

FIG. 25 is a cross-sectional side view of the article carrier member of FIG. 2 taken in accordance with section line 25—25 in FIG. 2, illustrating the locking finger of each bracket member engaged in an opening of an associated slat;

FIG. 26 is a view of the article carrier member of FIG. 25 with the actuating member in the unlocked position and each locking finger member retracted from locking engagement with its respective slat;

FIG. 27 is a plan view of an article carrier in accordance with an alternative preferred embodiment of the present invention showing one slat partially cut-away, the other slat in phantom, and the actuating lever in cross section to illustrate its coupling to an elongated actuating rod extending through the cross bar;

FIG. 28 is a partial cross-sectional end view of the article carrier of FIG. 27 shown substantially in accordance with section line 28—28 in FIG. 27;

FIG. 29 is a view of the latching member of the embodiment of FIG. 28 in the locked position, taken in accordance with directional arrow 29—29 in FIG. 28;

FIG. 30 is a view of the latching member of FIG. 29 in the unlocked position;

FIG. 31 is a cross sectional front view of an article carrier in accordance with yet another alternative preferred embodiment of the present invention;

FIG. 32 is a plan view of the internal components of the article carrier of FIG. 31 illustrating the cross bar in phantom;

FIG. 33 is a cross sectional side view of yet another alternative preferred embodiment of the present invention illustrating a pair of actuating levers which may be used to simultaneously latch and unlatch the cross bar from the pair of slats simultaneously from either side of the cross bar;

FIG. 34 is a view of the article carrier of FIG. 33 showing the left actuating lever in the unlocked position, which causes both of the locking members to be simultaneously retracted from locking engagement with their respective slats;

FIG. 35 is a side, partial cross-sectional view of an alternative preferred embodiment of the present invention with the locking members thereof in a locked orientation;

FIG. 36 is an exploded perspective view of a portion of the cross bar assembly and also a portion of its associated slat;

FIG. 37 is a front view of the locking member shown in FIG. 36;

FIG. 38 is a side, partial cross sectional view of the article carrier assembly of FIG. 35 but with the cross bar assembly shown in the unlocked orientation.

DETAILED DESCRIPTION OF THE PREFERRED EMBODIMENTS

Figure 1:
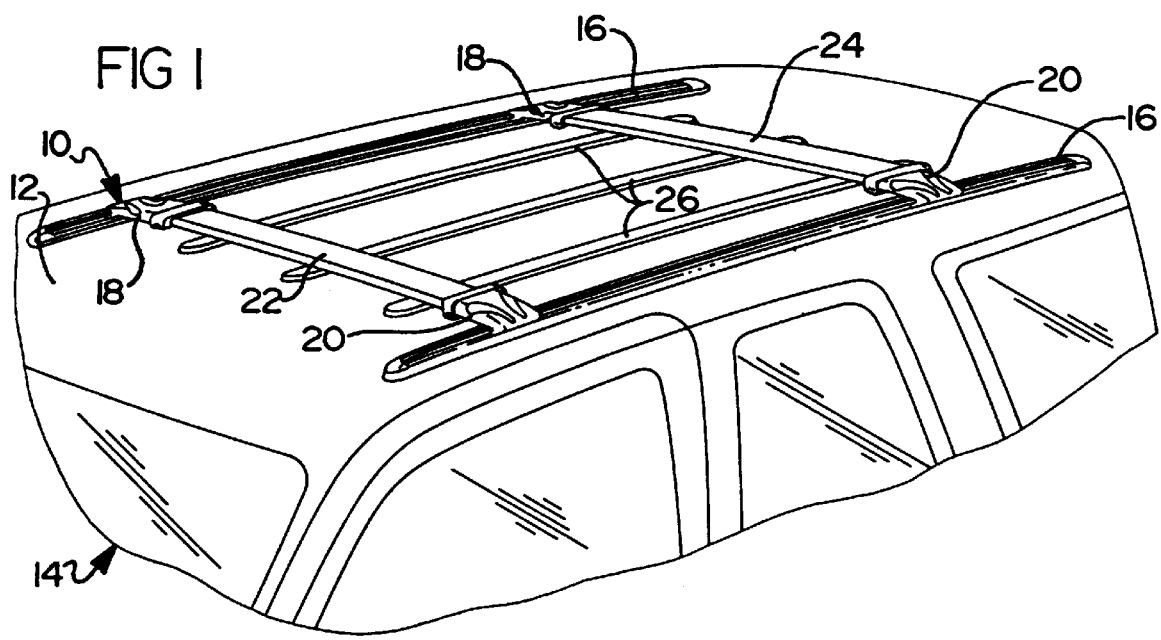
FIG. 1 is a perspective view of a vehicle article carrier in accordance with a preferred embodiment of the present invention showing the vehicle article carrier disposed on an outer body surface of a vehicle.

Referring to FIG. 1, there is shown a vehicle article carrier apparatus 10 in accordance with a preferred embodiment of the present invention. The apparatus 10 is secured to an outer body surface 12 of the vehicle 14 and generally includes a pair of elongated slats 16 fixedly secured to the outer body surface 12. A pair of bracket members 18 and 20 support cross bars 22 and 24 above the outer body surface 12 and allow each of the cross bars 22 and 24 to be adjustably positioned along the slats 16 as may be needed. It will be appreciated immediately, however, that while both of the cross bars 22 and 24 have been shown as adjustable cross bars, that one or the other could be fixedly secured to the slats 16 if desired. In fact, it is anticipated that in many applications this will be the preferred arrangement. Optionally, one or more intermediate slats 26 could also be secured to the outer body surface 12 to further protect the surface 12 from contact with articles being transported on the cross bars 22 and 24.

Referring to FIG. 1A, the slat 16 is shown. Slat 16 includes an inboard wall $16a_1$, and an outboard wall $16a_2$. Each of the walls $16a_1$, and $16a_2$ include a plurality of spaced apart openings 17. It will be appreciated, however, that each slat 16 could be formed with openings in only one of the wall portions, but that this would necessitate manufacturing two separate slats which would need to be installed along designated sides of the outer body surface (i.e., one along the passenger side and one along the driver's side). The slat 16, however, can be used on either side of the outer body surface 12 simply by orientating it 180 from its opposing slat. When the slats 16 are installed they are laterally aligned on the outer body surface 12 such that the openings 17 are directly across from each other, i.e., in a common plane, extending perpendicularly from one side of the vehicle 14.

Referring to FIGS. 2 and 3, cross bar 22 is shown with its bracket members 18 and 20. This assembly will be referred to as article carrier member 19. An integrally formed, horizontally extending tie down loop 28 (FIG. 2) and a vertically extending tie-down loop 29 (FIG. 3) are disposed at each end of the cross bar 22 for assisting in securing articles to the cross bar 22 via external fastening straps such as bungee cords or nylon straps. Each bracket member 18 and 20 includes an integrally formed pair of T-lugs or foot portions 30 which ride within channels formed in each of the slats 16, as will be described in detail momentarily. As best seen in FIG. 2, each of the foot portions 30 includes raised, semi-circular shoulder portions 32 integrally formed therewith. The raised shoulder portions 32 help to prevent the foot portions 30 from jamming in the slats 16 as first one end of the cross bar 22 is moved, and then the other, during repositioning of the cross bar 22 along the slats 16. Cross bar 24 and its bracket members 18 and 20 are of identical construction and will therefore not be described independently.

With further reference to FIG. 2, bracket member 18 includes a manually graspable, slidable shell forming an actuating member 34. The actuating member 34 includes a pair of recessed portions 36 adapted to allow one to manually grasp the actuating member 34 with a thumb and forefinger and to easily pull the actuating member 34 outwardly to the left in the drawing of FIG. 2. The bracket member 20 includes symmetrical recessed portions 37 simply for aesthetic purposes.

Figure 8:
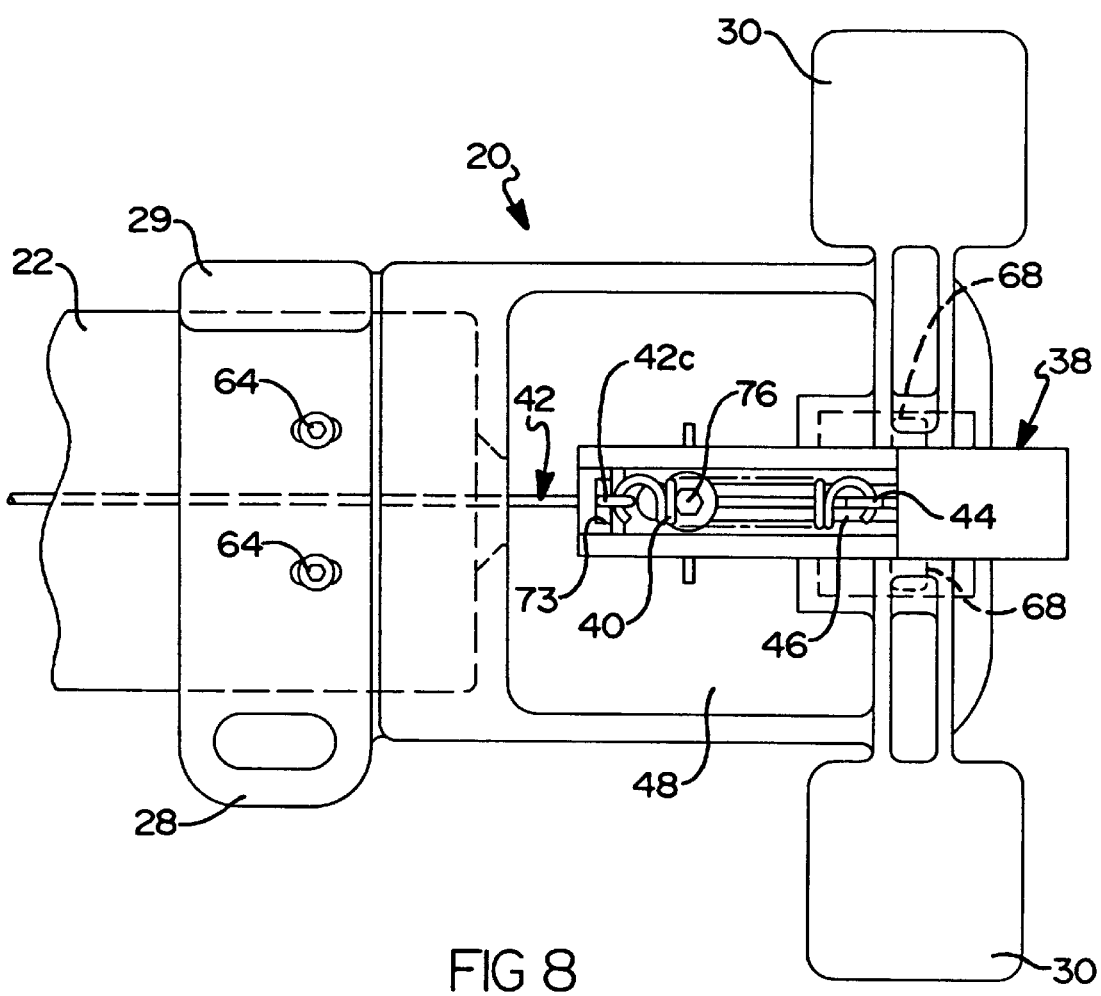
FIG. 8 is a view of the bracket member shown in FIG. 5 but with the biasing spring and locking finger member installed.
Figure 19:
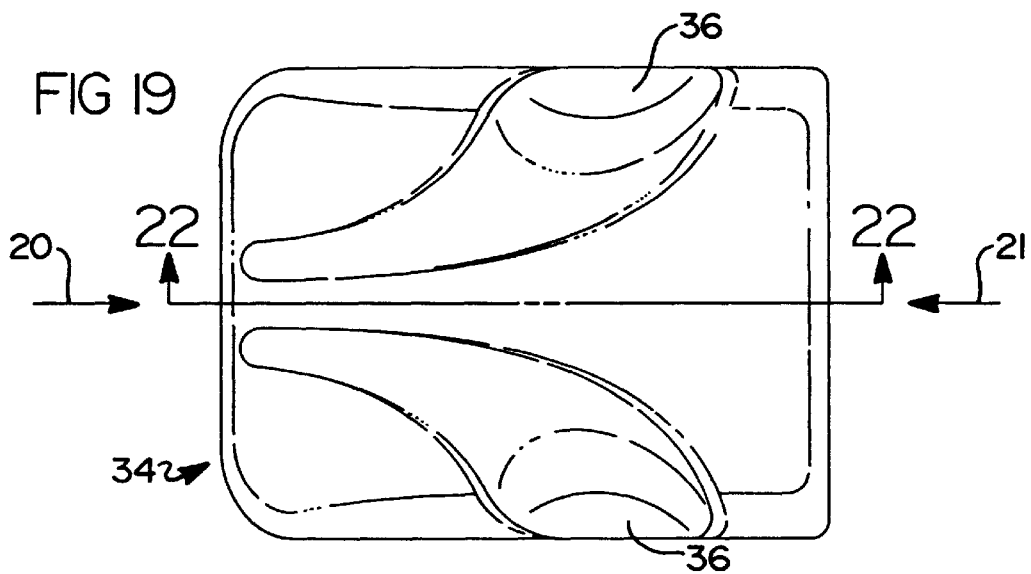
FIG. 19 is a plan view of the actuating member which fits on the bracket member of FIG. 15.
Figure 20:
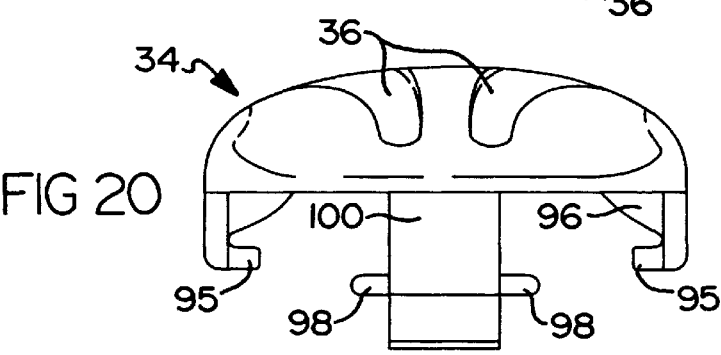
FIG. 20 is an end view of the actuating member of FIG. 19 taken in accordance with directional line 20 in FIG. 19.
Figure 21:
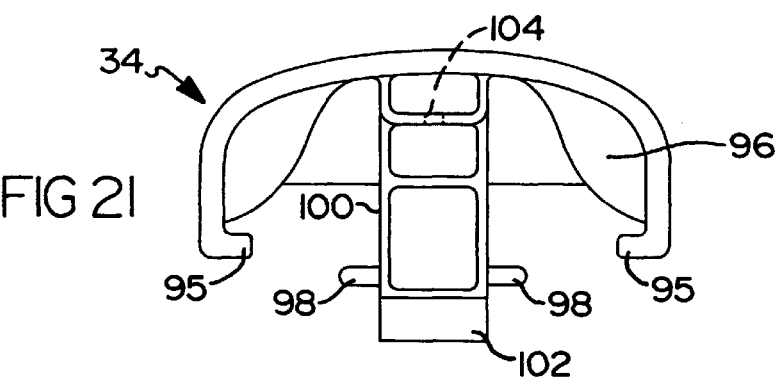
FIG. 21 is a rear end view of the actuating member of FIG. 19 taken in accordance with directional line 21 in FIG. 19.

Referring to FIGS. 3–8, the bracket member 20 is shown in greater detail. Referring initially to FIG. 8, the bracket member 20 can be seen to include a locking finger member 38, a biasing member in the form of a coil spring 40 and an elongated member or actuating rod 42. One end of the spring 40 is coupled to a protruding hook portion 44 (also shown in FIGS. 4 and 7) integrally formed with an undersurface 46 of a housing portion 48 of the bracket member 20. The opposite end of the spring 40 is coupled to a portion 42c of the elongated rod 42 so as to continuously bias the locking finger member 38 and the elongated rod 42 to the right in drawing FIG. 8, and therefore maintain the locking finger member 38 in a normally locked position relative to its associated slat 16.

With specific reference to FIG. 5, the under surface 46 of body portion 48 can also be seen to include an upstanding boss 52. The boss 52 includes a bore 54 sized to accept a fastening member such as a threaded fastener. In FIG. 5A, a portion of the upstanding boss 52 can also be seen to include notches which form co-planar shoulder portions 56. In FIG. 5, the upstanding boss 52 is formed longitudinally in line with an opening 58 through which the locking finger member 38 protrudes when in locking engagement with its associated slat.

With reference to FIGS. 4 and 6, the opening 58 in the body portion 48 can also be seen to include slots 60 on opposite sides of the opening 58. The slots 60 act as guides to allow sliding movement of the locking finger member 38, as will be described momentarily. The body portion 48 also includes an opening 62 into which one end of the cross bar 22 is inserted and fixedly secured via a plurality of threaded fasteners 64 (shown in FIG. 5) in conventional fashion.

Referring now to FIGS. 9–13, the locking finger member 38 can be seen in greater detail. The finger member 38 includes a finger portion 66, a pair of outwardly protruding arm portions 68, a main body portion 70, a first opening 72 formed in the main body portion 70, and a second opening 73 in communication with the first opening 72. From FIGS. 10 and 13, it can be seen that the finger member 38 also includes a slot 74 formed in the main body portion 70 having a width sufficient to allow a fastening member such as a threaded screw to protrude therethrough. A pair of lower edge surfaces 75 (FIG. 13) extend along the main body portion 70 on opposite sides of the slot 74.

Referring now to FIG. 14, the elongated rod 42 is shown. The elongated rod 42 has a first end 42a, a central portion 42b and a second end 42c. The rod 42 has an overall length sufficient to span the entire length of the cross bar 22. The rod 42 may be made form a variety of materials but is preferably made from metal.

With further reference to FIG. 8, the finger member 38 is shown assembled to the under surface 46 of bracket member 20. A threaded screw 76 is inserted into the bore 54 to hold the finger member 38 to the under surface 48. Lower edge surfaces 75 (FIG. 13) ride on the notches 56 (FIG. 5A) of the boss 52 to permit smooth sliding movement of the locking member 38. Portion 42c of the elongated rod 42 extends into the opening 73 to latch onto the finger member 38 and allow same to be pulled into a retracted (i.e., unlocked) position. The arm portions 68 ride within slots 60 (visible only in FIGS. 4 and 6) to guide the finger member 38 and to help prevent same from twisting or rocking vertically during its sliding movement. With brief reference to FIG. 10, it will also be appreciated that the depth of slot 74 is such that an end portion 80 of the slot 74 abuts the fastener 76 to limit the travel of the locking finger member 38 outwardly (to the right in FIG. 8) when same is being moved into a locked position.

Referring now to FIGS. 15–18, the bracket member 18 is illustrated without the actuating member 34 installed. With specific reference to FIG. 17, bracket member 18 includes a body portion 82 having a pair of outer channels 84 and a pair of inner channels 86. An opening 88 allows a finger portion of the actuating member 34 to be retracted out of locking engagement with the slat 16 associated with bracket member 18 when the actuating member 34 is pulled into an unlocked position.

From FIG. 16, it can also be seen that body portion 82 includes a portion 90 which supports the bracket member 18 in sliding relationship with its associated slat 16. Supporting the bracket member 18 on one side of foot portion 30 provides an extremely smooth sliding movement of the bracket member 18 along the outer surface portion 16a of the slat 16. As described previously, the semi-circular, raised shoulder portions 32 help to prevent jamming or binding of the bracket member 18 as the cross bar 22 is repositioned along the slat 16.

With brief reference to FIG. 18, the body portion 82 also includes an opening 92 into which an end portion of the cross bar 22 is inserted and held in conventional fashion by threaded fasteners (not shown). An opening 94 permits the first end portion 42a of the elongated rod 42 to protrude therethrough so as to be coupled to the actuating member 34, as will be described momentarily.

Referring now to FIGS. 19–22, the actuating member 34 is illustrated in greater detail. With specific reference to FIGS. 20 and 21, the member 34 includes a pair of inwardly protruding shoulder portions 95 integrally formed with an inner surface 96. A pair of protruding arm portions 98 extend from opposite sides of a central member 100 having a locking finger member or portion 102. The locking finger member 102, being integrally formed with the actuating member 34, provides a very positive "feel" or movement when the actuating member 34 is moved between locked and unlocked positions. The inwardly protruding shoulder portions 95 ride slidably within outer channels 84 (FIG. 17) of the body portion 82 while the arm portions 98 ride within the inner channels 86 (FIG. 17). The central portion 100 moves within the opening 88 and the inner surface 96 rests on the body portion 82.

Figure 22:
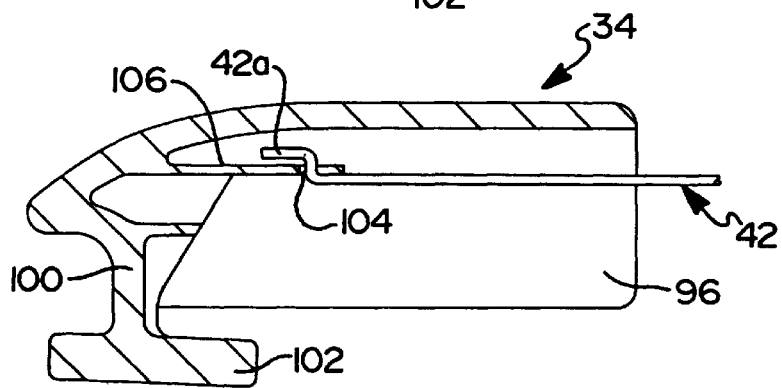
FIG. 22 is a cross sectional side view of the actuating member of FIG. 19 taken in accordance with section line 22—22 in FIG. 19, and illustrating a portion of the elongated rod coupled thereto.

With specific reference to FIG. 22, an opening 104 is provided in a surface portion 106 of the actuating member 34. The opening is provided to enable the first end portion 42a of the elongated rod 42 to be coupled to the actuating member 34.

Referring now to FIGS. 23 and 24, the bracket member 18 is shown in assembled form. In FIG. 23 the central member 100 is disposed within the opening 88, the inwardly protruding shoulder portions 95 extend into the outer channels 84, and the arm portions 98 extend into the inner channels 86. In FIG. 24, the finger portion 102 extends through one of the openings 17 in the slat 16. The bracket member 18 cannot be moved along the slat 16 without first retracting the finger portion 102 by sliding movement of the actuating member 34 to the left in FIG. 24.

Referring to FIG. 26, the bracket members 18 and 20 are shown disengaged when the actuating member 34 is manually urged to the left in this drawing figure. Releasing the actuating member 34 from the position shown in FIG. 26 allows the biasing member 40 to retract both the locking finger member 38 and the actuating member 34 via the elongated rod 42, thus placing each of the bracket members 18 and 20 in locked positions as shown in FIG. 25. This would permit the article carrier member 19 to be unlocked from the slats 16 at either end of the member 19.

In FIGS. 25 and 26 it will also be noted that at least a small section of foam or other dampening material 112 is preferably inserted within the cross bar 22 to prevent any possible vibration of the elongated rod 42 within the cross bar 22. The foam 112 may extend through the entire length of the cross bar 22 or a small section of foam 112 may be included at just a central area of the cross bar 22. It will also be appreciated that virtually any form of vibration deadening material could be used inside the cross bar 22 since same will not be subjected to the elements.

Referring now to FIG. 27, an article carrier 200 in accordance with an alternative preferred embodiment of the present invention is shown. The article carrier 200 is disposed on a pair of elongated slats 202 and includes bracket members 204 disposed at each end of a tubular cross bar 206. One of the bracket members 204 includes an actuating lever 203. Referring to FIG. 28, each slat 202 includes a plurality of pairs of aligned vertical openings 208 and is supported on a member 205 having a channel 205a formed longitudinally therealong. The member 205 may be manufactured from a suitably strong plastic and the channel 205a provides clearance for a latching member, which will be described momentarily.

With further reference to FIGS. 27 and 28, an elongated rod 210 extends throughout the entire longitudinal length of the cross bar 206 and is fixedly coupled to the actuating lever 203 by any conventional means such as a set screw. The rod 210 has a length sufficient to extend beyond vertical planes extending through each of the aligned pairs of openings 208 and into end portions 212 of each bracket member 204. Disposed at each end of the elongated rod 210, and fixedly secured thereto, is a latching member 214.

Referring to FIG. 29, each latching member 214 includes hook portions 216 protruding in opposite vertical directions so as to be able to engage within selected ones of the openings 208 formed in each slat 202. Each latching member 214 is further biased into a normally locked position, as shown in FIG. 29, by a biasing member 218 which engages with an opening 220 in each latching member 214 and also within an opening 222 formed in a housing portion 224 of each bracket member 204. T-lugs or foot portions 226 prevent each bracket member 204 from being removed from its associated slat 202. With brief reference to FIG. 28, the entire cross bar 206 is supported for sliding movement upon the slats 202 via neck portions 228.

With further reference to FIGS. 27, 29 and 30, when the actuating lever 203 is lifted manually by a user, it rotates the elongated rod 210 in a first rotational direction such that the latching members 214 disposed at each end of the rod 210 are urged from the position shown in FIG. 29 to the position shown in FIG. 30, for as long as the actuating lever is held in its unlocked (i.e., lifted) position. While held in this position, the cross bar 206 and both bracket members 204 can be readily slid along the slats 202 and repositioned as needed. Once the user releases the actuating lever 203, the latching members 214 are biased back into the position shown in FIG. 29 via the biasing members 218. The biasing members 218 also cause the actuating lever 203 to bed biased back into the position shown in FIG. 27. Thus, by simply manually engaging one actuating lever 203, both bracket members 204 can be placed in unlocked positions from one side of the vehicle. When the actuating lever 203 is released, both latching members 214 are automatically biased back into locking engagement with a pair of openings 208 in each slat 202. It will be appreciated, however, that if the latching members 214 are at a position inbetween a pair of openings 208, that a slight degree of further adjustment or repositioning along the slats 202 may be required until the latching members 214 are able to engage within a pair of openings 208 in each slat 202.

Referring now to FIGS. 31 and 32, yet another vehicle article carrier 300 in accordance with another alternative preferred embodiment is illustrated. The article carrier 300 includes a pair of slats 301 disposed on supports 301a secured to the outer body surface 12 of the vehicle 14. Each of the slats 301 has an inwardly turned lip portion 303 having a plurality of spaced apart openings or notches 303a formed longitudinally therealong.

The article carrier 300 also includes a pivotably mounted actuating lever or member 302 coupled to a disc-like member 304 disposed within a tubular cross bar 306. As seen in FIG. 32, the disc-like member 304 is coupled to a first elongated member 308 and a second elongated member 310. Each of the members 308 and 310 further include an integrally formed circular spring portion 308a and 310a, respectively. Attached to the opposite end of the first elongated member 308 is a locking member 312. An identical locking member 312 is attached to the opposite end of the second elongated member 310.

When the actuating member 302 in FIG. 31 is rotated from the locked position shown therein approximately 90° outwardly of the cross bar 306, the disc-like member 304 is rotated counter-clockwise about 90 in drawing FIG. 32. Each of the first and second elongated members 308 and 310 are thereby urged away from one another, thus causing the locking members 312 to be urged away from one another. This in turn causes a locking finger portion 312a of each locking member 312 to be urged outwardly of the openings 303a formed in each of the slats 301. Returning the actuating member 302 to the position shown in FIG. 31 causes both of the locking members 312 to be drawn toward each other and into locking engagement with the openings 303a in each of the slats 301. Thus, a single movement of the actuating lever 302 allows the locking members 312 to be simultaneously locked or unlocked from their respective slats 301.

Referring now to FIGS. 33 and 34, still another vehicle article carrier 400 in accordance with another alternative preferred embodiment of the present invention is shown. Vehicle article carrier 400 includes a pair of slats 402 each having a channel 404 extending longitudinally therealong and a plurality of spaced apart openings 406 longitudinally in line with the channel 404 (only one opening 406 being shown in each slat 402 in FIGS. 33 and 34). A tubular cross bar 408 includes a pair of actuating members or levers 410 disposed at opposite ends thereof. The actuating levers 410 each rest within openings 408a formed in the cross bar 408 when in the closed position shown in FIG. 33. Each of the actuating levers include arm portions 412 which rest within channels 416 formed within a mounting block 414, to allow each actuating lever 410 to be pivotably rotated about the channel 416 within which it is mounted. An opening 418 and a generally circular cross member 420 integrally formed with each actuating lever 410 allow a cable 422 to be entrained between the arm portion 412 and the generally circular member 420 of each actuating member 410. One end of each cable 422 is fixedly coupled to an actuating pin 424 disposed within an opening 426 in a bracket portion 428. Each bracket portion 428 further includes a neck portion 428a which supports the article carrier 400 in the channels 404. Each locking member 424 is further biased into a normally locked position (i.e., toward its associated openings 406) by a coil spring 430. The cable 422 is preferably formed in two sections to facilitate assembly and coupled by a splice 432. A tensioning spring 434 is coupled to tab members 436 at its outermost ends, and the tab members 436 are fixedly secured to portions of the cable 422.

In FIG. 33, both actuating levers 410 are shown in the locked position. The cable 422 has a small degree of slack when both actuating levers 410 are in the locked position, which the spring 434 helps to take up. Optionally, but preferably, one or more sections of foam 438 are disposed within the cross bar 408 to help prevent vibration or rattling of the cable 422 within the cross bar 408 during operation of the vehicle upon which the article carrier 400 is mounted.

In FIG. 34, when one of the actuating levers 410 is rotated approximately 90° into an unlocked position, a portion of the cable 422 is withdrawn by the circular cross member 420 of the lifted actuating lever 40. This effectively shortens the cable 422 and causes both of the locking members 424 to be urged towards each other and thus retracted from the openings 406 in their respective slats 402. When in the position shown in FIG. 34, the entire cross bar 408 can be moved slidably along channels 404 in the slats 402. Once the actuating lever 410 is released, the biasing force provided by the springs 430 urges each of the locking members 424 outwardly into openings 406 and pulls the actuating lever 410 back into the closed position shown in FIG. 33. The exact same locking and unlocking action can be effected by using the right-most actuating lever 410 in the drawing of FIG. 33. Thus, the cross bar 408 can be unlocked from the slats 402 at either end of the cross bar 408, and therefore from either side of the vehicle.

Referring now to FIG. 35, an article carrier system 500 in accordance with yet another alternative preferred embodiment of the present invention is shown. The article carrier system 500 includes a pair of slats 502 which are each fixedly secured to an outer body surface 504 of a vehicle 506 via a plurality of conventional threaded fastener assemblies 508. The preferred form of fastener 508 is a conventional "riv-nut" fastener which is well known in the art. It will be appreciated, however, that other forms of fasteners could also be employed.

Each slat 502 includes a pair of ledge portions 510 extending inwardly toward one another, a bottom wall portion 512 and an inner wall portion 514. The inner wall portion 514 has a plurality of spaced apart apertures 516 such as apertures 17 shown in FIG. 1 a hereof. The inwardly extending ledges 510 and the bottom wall 512 form a channel extending along the entire length of the slat 502.

Referring further to FIG. 35, mounted upon the slats 502 is a cross bar assembly 520. The cross bar assembly 520 generally includes a tubular cross bar 522 having opposite ends 522a and 522b. Secured to end 522a is a bracket assembly 524a. Secured to end 522b is a bracket assembly 524b. The two bracket assemblies 524a and 524b are essentially identical, with minor structural variations that will be described momentarily. Each bracket assembly 524 is secured to its respective end 522 via conventional threaded fasteners (not shown) which extend through apertures 526 formed in an undersurface 528 of a housing 530 of each assembly 524.

With further reference to FIG. 35, each bracket assembly 524 further includes a locking member 532. The locking member 532 of each bracket assembly 524 is identical in construction and includes a locking portion 534, a central portion 536 and an integrally formed actuating portion 538. The central portion 536 further includes a circumferential channel or groove 540 and a pair of boss portions 542 (only one being visible in FIG. 35). Depending from the locking portion 534 is a flexible arm portion 544 having a head portion 546 adapted to engage within a notch 548 formed in an edge 550 of an opening 552 of the housing 530b. The head portion 546, when engaged in the notch 548, functions to hold the locking member 532 in the unlocked position (shown in FIG. 38). This function will be described further in the following paragraphs. A T-lug portion 554 is disposed within the channel 518 such that the bracket assembly 524b cannot be removed from the slat 502 when secured therein, and once forward and rear end caps (not shown) are attached to the slat 502 at its opposite terminal ends.

Referring briefly to FIG. 36, the opening 552 includes a pair of channels 556 each having a recess 558. The housing 530b also includes a pair of bosses 560 each having a slot 562 formed therein and a frusto-conical shaped head portion 564.

A wheel 566 having an opening 568 is urged over the head portion 564 and snappingly engages onto the boss 560. The wheels 566 are preferably made from plastic, but may be made from a variety of other materials. The wheels 566 prevent "binding" of the cross bar as it is moved slidably along the slats 502 while being repositioned.

Referring briefly to FIG. 37, the locking member 532 can be seen to include a pair of boss portions 542 projecting in opposite directions and longitudinally in line with one another. Each boss portion 542 includes a semi-circular portion 542a. The boss portions 542 are adapted to slide within the channels 556 and to snap into the recesses 558. The semi-circular end portions 542a assist in installing the locking member 532 and the ability of the boss portions 542 to readily snap into the recesses 558. Accordingly, no special tools are required to install the locking member 532 within the housing 530b.

With further reference to FIG. 36, the housing 530b is aerodynamically shaped and includes a scalloped area 570 which is adjacent the actuating portion 538 of the locking member 532 when the locking member is installed in the opening 552. Thus, the actuating portion 538 can be easily grasped with one or more fingers and pulled outwardly to cause the entire locking member 532 to rotate about the boss portions 542. The width of the locking portion 534, as designated by dimensional arrows 572 in FIG. 37, is just slightly smaller than the width of the apertures 516 formed in the slat 502. Thus, the locking portion 534 is operable to engage within one of the openings 516 in the slat 502 when aligned therewith and when the locking member 532 is in a locked position. It will also be appreciated that each of the locking members 532 are identical in construction. Accordingly, each can be installed in either of the bracket assemblies 524a or 524b in the identical manner.

Referring further to FIG. 35, a cable 574 is entrained through the interior of the cross bar 522 and coupled to each of the locking members 532. A first end 574a includes a connecting portion 576 attached thereto which is adapted to fit in notch 578a formed in the central portion 536 and a notch 578b formed in a surface wall of the locking member. The first end 574a of the cable 574 is placed within the channel 540 and is retained in the channel 540 once the locking member 532 is snapped into the opening 552 of the housing 530b during assembly. The cable 574 includes a second end 574b which is inserted into the channel 540 in bracket assembly 524a. A connecting portion 580 is engaged within the notches 578a and 578b in the central portion 536. A terminal end portion 574 of the cable 574 is secured via a coiled spring 582 to a hook member 584 which is fixedly secured to a mid portion 574d of the cable 574. The spring 582 provides a constant tension on both ends of the cable 574 which tends to bias both of the locking members 532 simultaneously into locked positions as shown. The cable 574 may comprise a length of steel cable or nylon cable or any other form of material which is flexible but which resists stretching.

With further reference to FIG. 35, it will be noted that the notch 548 in the wall portion 550 of bracket assembly 524b is not present on the corresponding wall portion 550 of bracket assembly 524a. Also, it will be noted that the scalloped portion 570 in bracket assembly 524b is not present in bracket assembly 524a. Thus, the locking members 532 can only be unlocked simultaneously by grasping and rotating the locking member 532 associated with bracket assembly 524b. It will be appreciated, however, that a scalloped area could just as readily be provided on bracket member 524a to enable its associated locking member 532 to be engaged manually by an individual to thereby enable the cross bar assembly 520 to be unlocked from the slats 502 from either side of the cross bar assembly 520.

Referring now to FIG. 38, the cross bar assembly 520 is shown in its unlocked orientation. In this orientation the entire cross bar assembly 520 may be moved slidably along the slats 502 to a new position as needed. Once the cross bar assembly 520 is proximately aligned with the openings 516 in each slat 502, then the actuating portion 538 of the locking member 532 may be pushed into the position shown in FIG. 35. This movement simultaneously causes the cable 574 to rotate the locking member 532 of bracket assembly 524a in a counterclockwise direction when viewing FIG. 38, to cause both locking members 532 to be urged simultaneously into the locked position shown in FIG. 38. If the bracket assemblies 524 are not aligned with the openings 516 in each slat 502, then a further small degree of longitudinal adjustment of the cross bar assembly 520 may be made until the two locking members 532 "snap" into the openings 516 in each slat 502.

To assemble the cross bar assembly 520, the connecting portion 580 is placed in notches 578 of the locking member 532 associated with bracket assembly 524a. The locking member 532 is then snapped into the bracket member 524a. The free ends of the cable 574 are then fed through the interior of the cross bar 522 and connecting portion 576 is engaged within notches 578a and 578b of the locking member 532 associated with the other bracket assembly 524b. The locking member 532 is then inserted through the opening 552 such that the actuating portion 538 is inserted first into the opening 552. As the boss portions 542 enter the channels 556 in the opening 552, the locking member 532 may be "snapped" into engagement in the recesses 558 of the bracket member 524b in the same manner as was previously done with bracket member 524a. Accordingly, no special tools are required and the assembly may be affected by a single individual within minutes.

FIG. 38 also illustrates the head portion 546 of the flexible arm portion 544 engaged with the notch 548, holding both locking members 532 in unlocked orientations. Once the bracket members 524a and 524b are aligned with apertures 516 in the slats 502, a slight push on the actuating portion 538 of bracket member 524b will disengage the flexible arm portion 544 from the notch 548, thus allowing the biasing member to rotate both locking members 532 back into the positions shown in FIG. 35.

Figure 39:
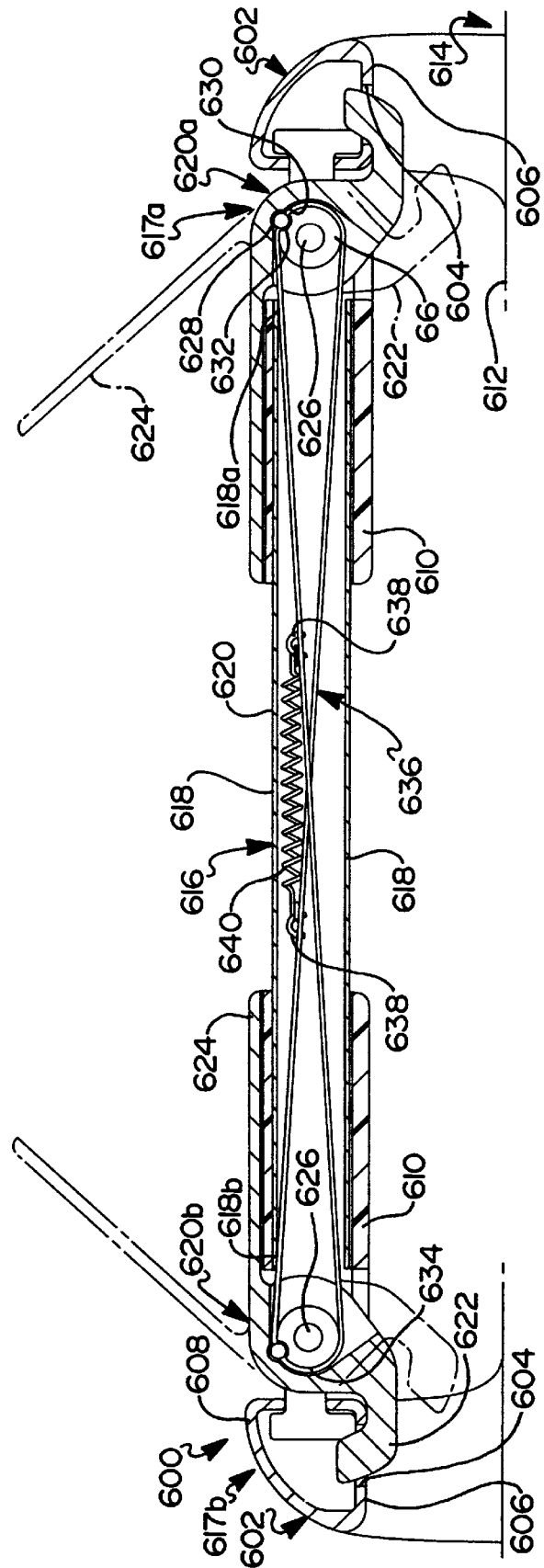
FIG. 39 is a side cross sectional view of another alternative preferred embodiment of the present invention.

Referring now to FIG. 39, yet another article carrier system 600 in accordance with another alternative preferred embodiment is shown. The article carrier system 600, in this embodiment, includes a pair of raised side rails 602 instead of slats. The side rails 602 each have a plurality of openings 604 spaced apart along an undersurface 606 of a rail portion 608 thereof. End supports 610 are used to support the rail portion 608 above an outer body surface 612 of a motor vehicle 614. A cross bar assembly 616 is coupled between the slats 602.

With further reference to FIG. 39, the cross bar assembly 616 includes a tubular cross bar 618 having end portions 618a and 618b. An opening 620 is formed along preferably the entire length of the cross bar 616, the purpose of which will be described momentarily. Locking members 620a and 620b are pivotably secured at opposite ends of the cross bar 618 within bracket members 617a and 617b. Each locking member 620 is coupled in a fashion identical to that described in connection with the locking member 532 in FIG. 36. Each locking member 620 includes a locking portion 622 and an actuating portion 624. The actuating portion 624 may be grasp ed by a user so as to rotate the entire locking member 620 about the coaxial center of a central portion 626 thereof. A notch 628 is also formed in an interior surface 630 of each locking member 620, as is a notch 632 in the central portion 626. A semi circular groove 634 is defined between a central portion 626 and the interior surface 630 of each locking member 620.

Referring further to FIG. 39, an endless cable 636 is inserted through the opening 620 in the cross bar 618. The cable 636 includes two hook portions 638 which are fixedly secured to the cable 636, and to which the ends of a spring 640 are secured.

In operation, the actuating portion 624 of either locking member 620 may be lifted away from its bracket member 617. This causes the cable 636 to move and cause the opposite locking member 620 to rotate in the opposite direction, thereby enabling both locking members 620 to be rotated in opposite directions in the drawing of FIG. 39. The locking members 620 are shown in their unlocked orientations in phantom relative to the side rails 602. When in the locked position shown in FIG. 39, the spring 640 exerts tension at two points on the cable 636 which maintains each of the locking members 620 in their locked orientations.

While no means is disclosed in connection with cross bar assembly 616 for holding the locking members 620 in their unlocked orientations, structure such as the flexible finger portion 544 and the notch 548 shown in FIG. 35 could just as easily be incorporated into the cross bar assembly 616 to accomplish this function.

The cross bar assembly 616 allows both locking members 620 to be unlocked simultaneously from either end thereof. For those applications where the ability to unlock both locking members simultaneously from either side of the cross bar 616 is highly desirable, the article carrier system 600 provides a simple and easily constructed means for providing such a locking mechanism.

The assembly of the cross bar assembly 616 is accomplished by dropping the endless cable 636 through the opening 620 in the cross bar 618. First one end of the cable 636 is entrained through the groove 634 and one of the locking members 620 such that the connecting portion 628 is positioned within the notches 628 and 632. Then that locking member 620 is snapped into engagement with its associated bracket member 617. Next, the opposite end of the cable 636 is entrained through the groove 634 in the other locking member 620 such that the connecting portion 628 resides within its notches 628 and 632. That locking member 620 is then also snapped into engagement with its associated bracket member 617. The spring 640 is then connected between the hook portions 638. Finally, a rubber bumper strip or other component may be inserted into the opening 620 to close off the interior of the cross bar 618. The cross bar assembly 616 may then be installed on the side rail 602.

From the description of each of the preferred embodiments disclosed herein it will be appreciated that an article carrier is provided which includes a cross bar which can be unlocked from a pair of slats simultaneously via a single actuating member and simultaneously locked to both slats via the same actuating member. This significantly enhances the convenience to the user in repositioning a cross bar since this step can be performed from one side of the vehicle.

The actuating members and the bracket members of the various preferred embodiments described herein are preferably manufactured from high strength plastics through conventional molding techniques such as injection molding. The slats of the various preferred embodiments are preferably formed from metal and may be roll formed or manufactured in multi-piece assemblies if desired. Each of the embodiments described herein is further relatively simple to construct and generally comprises a relatively small number of independent component parts. As such, each of the embodiments disclosed herein can be constructed relatively economically.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vehicle article carrier apparatus for supporting articles above an outer body surface of a vehicle, said apparatus comprising:

a pair of slats adapted to be fixedly secured to said outer body surface;

a cross bar;

a pair of bracket members disposed at opposite ends of said cross bar for adjustably supporting said cross bar on said slats, one of said bracket members including an actuating member graspable by an individual;

an elongated coupling member extending through an interior area of said cross bar and spanning between said bracket members;

each of said bracket members including:

a pivotably disposed locking member having a locking portion, said locking member further including a connecting portion for accepting and engaging with a portion of said coupling member;

said locking portion of each said locking member pivotally engaging with its associated said slat when said locking members are in a locked position relative to their respective said slats; and a biasing member operably associated with at least one of said locking members for normally biasing both of said locking members into the locked position when no external force is being applied to said actuating portion of either locking member;

wherein said actuating member of one of said bracket members is operably associated with at least one of said locking members to thereby rotate said one locking member into an unlocked position relative to its associated said slat when said actuating member is actuated by the individual, wherein rotation of said one locking member causes said elongated member to rotate the other one of said locking members substantially simultaneously into an unlocked orientation relative to its associated said slat; and wherein said biasing member causes both of said locking members to be simultaneously urged into locked positions relative to their respective said slats when said individual releases said one locking member.

2. The apparatus of claim 1, wherein said actuating member is integrally formed with said one locking member.

3. The apparatus of claim 1, wherein said elongated member comprises a cable.

4. The apparatus of claim 1, wherein said elongated member comprises an elongated steel cable.

5. The apparatus of claim 1, wherein said elongated member comprises a pair of connecting portions, with each said connecting portion being adapted to engage with an associated one of said locking members.

6. The apparatus of claim 1, wherein said elongated member comprises a cable having a pair of connecting members associated with respective said connecting portions; and wherein said connecting members are urged by said biasing member to maintain each of said locking members in said locked position when said actuating member is not engaged by said individual.

7. The apparatus of claim 1, wherein said one locking member includes a flexible finger portion and said one bracket member includes a notch for engaging said flexible finger when said one locking member is rotated into said unlocked position, to thereby hold each said locking member in said unlocked position when said individual releases said actuating member after urging said one locking member into said unlocked position.

8. A vehicle article carrier apparatus for supporting articles above an outer body surface of a vehicle, said apparatus comprising:

a pair of slats adapted to be fixedly secured to said outer body surface, each of said slats having a plurality of openings spaced apart therealong;

a cross bar;

a pair of bracket members disposed at opposite ends of said cross bar for adjustably supporting said cross bar on said slats, one of said bracket members including an actuating member graspable by an individual;

an elongated cable extending through an interior area of said cross bar and having a length sufficient to span between said bracket members;

each of said bracket members including:

a pivotably disposed locking member having a locking portion, said locking member further including a channel for accepting and engaging with a portion of said cable;

said locking portion of each said locking member being movable into a locked position to engage with at least one of said openings in its associated said slat when aligned with one of said openings in its said associated slat; and a biasing member operably associated with said cable for biasing both of said locking members into said locked position when no external force is being applied to said actuating member; and wherein said actuating member of one of said bracket members is operably associated with at least one of said locking members to thereby rotate said one locking member into an unlocked position relative to its associated said slat, wherein rotation of said one locking member causes said elongated cable to rotate the other one of said locking members substantially simultaneously into an unlocked orientation relative to its associated said slat;

wherein said biasing member causes both of said locking members to be simultaneously urged into locked positions relative to their respective said slats when said individual releases said one locking member; and at least one of said locking members including a flexible finger portion for engaging with a notched portion of its associated said bracket member when said one locking member is urged into an unlocked position, to thereby hold both of said locking members in said unlocked position.

9. The apparatus of claim 8, wherein each said bracket member includes an opening for receiving one of said locking members;

said opening having a pair of spaced apart wall portions with each said wall portion having a recess; and wherein each said locking member includes a pair of pivot portions about which its said locking member pivots when moved between said locked and said unlocked positions; and wherein said pivot portions are snapped into engagement in said recesses in said wall portions to fasten said locking members to said bracket members.

10. The apparatus of claim 8, wherein said actuating member is integrally formed with said one locking member; and wherein said one bracket member includes a scalloped portion adjacent said actuating member to ease grasping of said actuating member.

11. The apparatus of claim 8, wherein said biasing member is coupled to between an intermediate portion of said cable and one end of said cable, to thereby urge both of said locking members into said locked position.

12. A vehicle article carrier apparatus for supporting articles above an outer body surface of a vehicle, said apparatus comprising:

a pair of slats adapted to be fixedly secured to said outer body surface, each of said slats having a plurality of openings spaced apart therealong;

a cross bar;

a pair of bracket members disposed at opposite ends of said cross bar for adjustably supporting said cross bar on said slats, one of said bracket members including an actuating member graspable by an individual;

an elongated cable extending through an interior area of said cross bar and having a length sufficient to span between said bracket members;

each of said bracket members including:

a pivotably disposed locking member having a locking portion, said locking member further including a channel for accepting and engaging with a portion of said cable;

said locking portion of each said locking member being movable into a locked position to engage with at least one of said openings in its associated said slat when aligned with one of said openings in its said associated slat; and a biasing member operably associated with said cable for biasing both of said locking members into said locked position when no external force is being applied to said actuating member; and wherein said actuating member of one of said bracket members is integrally formed with at least one of said locking members to thereby rotate said one locking member into an unlocked position relative to its associated said slat, wherein rotation of said one locking member causes said elongated members to rotate the other one of said locking members substantially simultaneously into an unlocked orientation relative to its associated said slat;

wherein said biasing member causes both of said locking members to be simultaneously urged into said locked positions relative to their respective said slats when said individual releases said one locking member; and at least one of said locking members including a flexible finger portion for engaging with a notched portion of its associated said bracket member when said one locking member is urged into an unlocked position, to thereby hold both of said locking members in said unlocked position.

* * * * *

UNITED STATES PATENT AND TRADEMARK OFFICE
CERTIFICATE OF CORRECTION

PATENT NO. : 6,112,964
DATED : September 5, 2000
INVENTOR(S) : John S. Cucheran et al It is certified that error appears in the above-identified patent and that said Letters Patent is hereby corrected as shown below:

Col. 6, line 54, "180" should be --180°--

Col. 8, line 3, delete "form" and substitute --from-- therefor

Col. 10, line 51, "90" should be --90°--

Col. 12, line 2, "FIG. 1 a" should be --FIG. 1a--

Col. 13, line 22, "portion 574" should be --portion 574c--

Col. 14, line 42, "grasp ed" should be --grasped--

Col. 18, line 41, claim 12, delete "members" and substitute --cable--therefor

Signed and Sealed this

First Day of May, 2001

Attest:

NICHOLAS P. GODICI

Attesting Officer    Acting Director of the United States Patent and Trademark Office